US012374193B2

(12) United States Patent
Walsh et al.

(10) Patent No.: US 12,374,193 B2
(45) Date of Patent: Jul. 29, 2025

(54) ELECTRONIC GAMING SYSTEMS AND METHODS FOR PRESENTING A BONUS GAME WITH ENHANCED CHARACTERISTICS

(71) Applicant: Aristocrat Technologies, Inc., Las Vegas, NV (US)

(72) Inventors: Kevin Walsh, Reno, NV (US); Jeffrey Uss, Reno, NV (US); Daniel Marston, Reno, NV (US); David Marsh, Charlottesville, VA (US); Allon Englman, Las Vegas, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 288 days.

(21) Appl. No.: 18/303,002

(22) Filed: Apr. 19, 2023

(65) Prior Publication Data

US 2024/0105015 A1 Mar. 28, 2024

Related U.S. Application Data

(60) Provisional application No. 63/410,368, filed on Sep. 27, 2022.

(51) Int. Cl.
*G07F 17/32* (2006.01)

(52) U.S. Cl.
CPC ...... *G07F 17/3267* (2013.01); *G07F 17/3213* (2013.01)

(58) Field of Classification Search
None
See application file for complete search history.

(56) References Cited

U.S. PATENT DOCUMENTS

| | | | | |
|---|---|---|---|---|
| 7,192,347 | B1 * | 3/2007 | Marks | G07F 17/3209 463/19 |
| 10,614,666 | B2 | 4/2020 | Eubanks | |
| 2002/0151349 | A1 * | 10/2002 | Joshi | G07F 17/32 463/20 |
| 2003/0054875 | A1 * | 3/2003 | Marks | G07F 17/32 463/20 |
| 2007/0087809 | A1 | 4/2007 | Baerlocher | |
| 2014/0194183 | A1 * | 7/2014 | Pierer | G07F 17/3211 463/20 |
| 2016/0358412 | A1 | 12/2016 | Eaton | |

(Continued)

*Primary Examiner* — Jason T Yen
(74) *Attorney, Agent, or Firm* — Armstrong Teasdale LLP

(57) ABSTRACT

An electronic gaming device includes a display device and a game controller in communication with the display device. The game controller includes a processor and a memory storing instructions, which when executed by the processor, cause the game controller to: cause display of a base game including a plurality of reels; control the plurality of reels to display a combination of symbols corresponding to a primary game outcome; determine that the primary game outcome satisfies a bonus game condition and an enhancement condition to trigger a bonus game having at least one enhanced characteristic; identify outcomes for one or more free spins of the bonus game having the at least one enhanced characteristic; randomly select an outcome for each free spin from the identified outcomes; and initiate the bonus reel game that includes display of the randomly selected outcome for each of the one or more free spins.

20 Claims, 18 Drawing Sheets

(56) References Cited

U.S. PATENT DOCUMENTS

| | | | |
|---|---|---|---|
| 2020/0312086 | A1 | 10/2020 | Kendall |
| 2021/0225128 | A1 | 7/2021 | Marks |
| 2022/0351570 | A1 | 11/2022 | Marks |

* cited by examiner

ELECTRONIC GAMING SYSTEMS AND METHODS FOR PRESENTING A BONUS GAME WITH ENHANCED CHARACTERISTICS

CROSS-REFERENCE TO RELATED APPLICATION

This application claims priority to U.S. Provisional Patent Application No. 63/410,368, filed Sep. 27, 2022, the disclosure of which is hereby incorporated by reference herein in its entirety.

TECHNICAL FIELD

The field of disclosure relates generally to electronic gaming, and more specifically, to electronic gaming systems and methods that include presenting a bonus game having one or more enhanced characteristics.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Notably, some games may include an element of skill on the part of the player and are therefore not entirely random.

BRIEF DESCRIPTION

In one aspect, an electronic gaming device includes a display device and a game controller in communication with the display device. The game controller includes a processor and a memory device, the memory device storing instructions, which when executed by the processor, cause the game controller to: control the display device to display a base reel game including a reel matrix for a plurality of reels; control the plurality of reels to display a base reel game outcome that includes a combination of symbols in the reel matrix corresponding to a primary game outcome; determine that the primary game outcome satisfies a bonus game condition to trigger a bonus reel game that includes one or more free spins and an enhancement condition to trigger at least one enhanced characteristic of the bonus reel game; in response to the bonus game condition and the enhancement condition each being satisfied, identify outcomes for the one or more free spins of the bonus reel game having the at least one enhanced characteristic; randomly select an outcome for each of the one or more free spins from the identified outcomes; and initiate, on the display device, the bonus reel game having the at least one enhanced characteristic, wherein the bonus reel game includes display of the randomly selected outcome for each of the one or more free spins. The instructions may direct additional, less, or alternate functionality, including that discussed elsewhere herein.

In another aspect, a method of electronic gaming implemented on an electronic gaming machine includes: causing display of a base reel game including a reel matrix for a plurality of reels; controlling the plurality of reels to display a base reel game outcome that includes a combination of symbols in the reel matrix corresponding to a primary game outcome; determining that the primary game outcome satisfies a bonus game condition to trigger a bonus reel game that includes one or more free spins and an enhancement condition to trigger at least one enhanced characteristic of the bonus reel game; in response to the bonus game condition and the enhancement condition each being satisfied, identifying outcomes for the one or more free spins of the bonus reel game having the at least one enhanced characteristic; randomly selecting an outcome for each of the one or more free spins from the identified outcomes; and causing display of the bonus reel game having the at least one enhanced characteristic, wherein the bonus reel game includes display of the randomly selected outcome for each of the one or more free spins. The method may include additional, less or alternate actions, including those discussed elsewhere herein.

In another aspect, a non-transitory computer-readable storage medium with instructions stored thereon is provided. The instructions, in response to execution by at least one processor, cause the at least one processor to: control a display device to display a base reel game including a reel matrix for a plurality of reels; control the plurality of reels to display a base reel game outcome that includes a combination of symbols in the reel matrix corresponding to a primary game outcome; determine that the primary game outcome satisfies a bonus game condition to trigger a bonus reel game that includes one or more free spins and an enhancement condition to trigger at least one enhanced characteristic of the bonus reel game; in response to the bonus game condition and the enhancement condition each being satisfied, identify outcomes for the one or more free spins of the bonus reel game having the at least one enhanced characteristic; randomly select an outcome for each of the one or more free spins from the identified outcomes; and initiate, on the display device, the bonus reel game having the at least one enhanced characteristic, wherein the bonus reel game includes display of the randomly selected outcome for each of the one or more free spins. The instructions may direct additional, less, or alternate functionality, including that discussed elsewhere herein.

DETAILED DESCRIPTION

Figure 1:
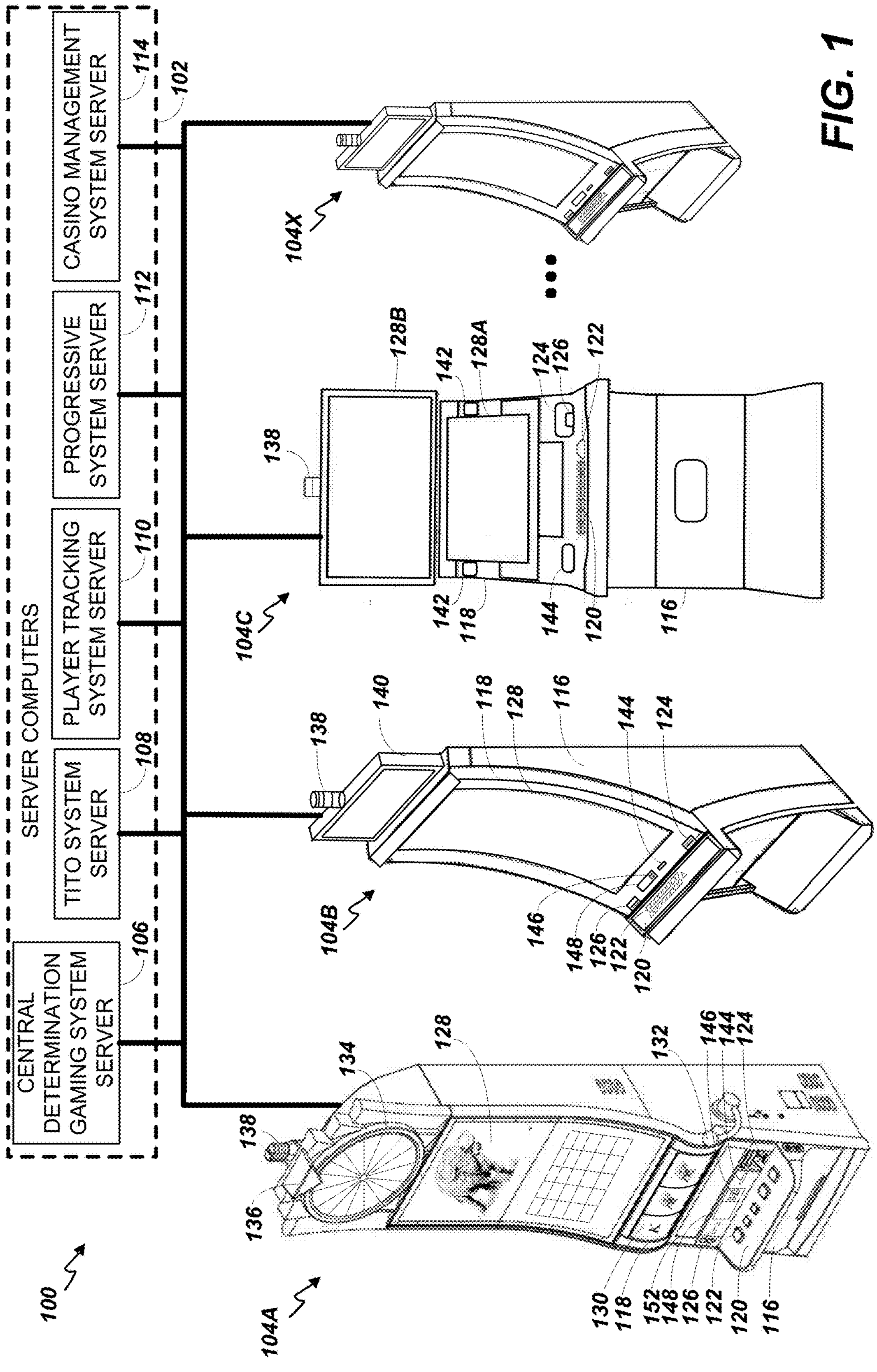
FIG. 1 is an exemplary diagram showing several EGMs networked with various gaming related servers.

In conventional electronic gaming systems and methods, awards and/or outcomes of a primary game may be presented to a player as awards and/or outcomes of a secondary game. For example, an electronic gaming device operating a Class II (e.g., bingo or keno) game may present an outcome of the Class II game as a reel game (e.g., a slot game) simulation. The outcome of the Class II game is determinative of an outcome of the simulated reel game. For example, an award value associated with the Class II game outcome may be presented in the simulated reel game outcome as a symbol combination and/or one or more special symbols that correspond to the same award value. In some known Class II games, the award value of the Class II game outcome may be partitioned or distributed across a base reel game outcome and one or more bonus reel game outcomes (e.g., outcomes of one or more free reel spins). For example, an award value associated with one or more winning bingo patterns may be presented as being awarded in a base reel game outcome and one or more bonus reel game outcomes. While some variations exist for presenting the Class II game outcome across the base reel game outcome and/or the one or more bonus reel game outcomes exist, the variability and flexibility in presenting these outcomes remain limited. A need exists to address these limitations to facilitate increasing player excitement and engagement.

Embodiments of the present disclosure provide systems and methods for presenting a base reel game outcome and one or more outcomes of a bonus reel game that has one or more enhanced characteristics. The enhanced characteristics of the bonus reel game provide an additional entertainment aspect of an electronic game by increasing the variability and flexibility in presenting winning outcomes of the bonus reel game (e.g., winning symbol combinations and/or special symbols). The enhanced characteristics may include, for example, expanding a reel matrix displayed during the bonus game to increase a number of pay lines for winning symbol combinations and/or to increase the number of positions in the reel matrix for a special symbol (e.g., a cash on reel symbol) to be displayed. The enhanced characteristics may additionally and/or alternatively include applying one or more multiplier values to a credit or monetary value awarded for one or more winning outcomes of the bonus reel game. The enhanced characteristics may additionally and/or alternatively include causing a different set of reels having special symbols (e.g., cash on reel symbols) to spin during the bonus reel game, each special symbol being associated with a credit or monetary value awarded when the special symbol is displayed in the reel matrix in an outcome of the bonus reel game. Other enhanced characteristics may also be implemented, such as those described elsewhere herein. Moreover, various combinations of the enhanced characteristics may be implemented to further increase the variability and flexibility in presenting winning outcomes of the bonus reel game.

In example systems and methods described herein, the presented base reel game outcome and bonus reel game outcome(s) correspond to an output of a gaming device. The output of the gaming device may be a primary game outcome, such as a Class II (e.g., bingo) game outcome, a Class III (e.g., RNG based) game outcome, and/or an outcome of another wagering game. In Class II games, a total award value of one or more winning outcomes (e.g., winning bingo patterns) may be partitioned or distributed across a base reel game outcome and one or more bonus game outcomes. Applying one or more enhanced characteristics to the bonus reel game facilitates increasing the flexibility and variability in how Class II game outcomes are presented as an outcome of the bonus reel game, and facilitates increasing player excitement during the bonus reel game as each enhanced characteristic may be perceived as providing an additional opportunity for a winning bonus reel game outcome (e.g., by expanding the reel matrix and/or spinning a different set of reels that include special symbols associated with a credit or monetary value when displayed), and/or an increased monetary value awarded for a winning bonus reel game outcome (e.g., by applying a multiplier to each winning outcome). In Class III games, the gaming device output may itself be the outcome of the base reel and bonus reel games (e.g., the gaming device output may be a randomly determined symbol combination and/or special symbol(s) displayed in the game outcome), and the enhanced characteristics may be randomly applied to provide additional opportunities to achieve a winning outcome of the bonus reel game outcome and/or to increase a value awarded for a winning bonus reel game outcome, thereby facilitating increasing randomness in Class III bonus reel game outcomes and increasing player excitement and engagement.

Example systems and methods described herein may include causing display of visual effects that are each associated with one of the enhanced characteristics. For example, one or more metamorphics, each associated with one of the enhanced characteristics, may be displayed. Metamorphics include symbols or other graphics capable of transforming (e.g., "metamorphosing"), and as each metamorphic transforms, players may experience a sense that a game feature has been triggered or that the metamorphics are slowly maturing towards a trigger condition for a game feature. In example systems and methods described herein, the metamorphics transform between inactive, intermediate, and active states, and as the metamorphics transform, players receive a visual indication as to whether a bonus reel game that is triggered during play of a base reel game includes one or more of the enhanced characteristics. Transformation of the metamorphics may be tied to a base reel game outcome. For example, in a base reel game outcome, one or more enhancement symbols may be displayed in a reel matrix, each of the one or more enhancement symbols being associated with one of the enhanced characteristics. For a Class II game, display of an enhancement symbol in the reel matrix in the base reel game outcome may be controlled based on a Class II game (e.g., bingo) outcome and is perceived as triggering an enhanced characteristic of the bonus reel game if the bonus reel game is also triggered during the base reel game. For a Class III game, display of an enhancement symbol in the reel matrix in a base reel game outcome may be randomly determined (e.g., by an RNG outcome) and may serve as the trigger for an enhanced characteristic of the bonus reel game. In both cases, a visual representation may be displayed that indicates that the at least one enhancement symbol being displayed in the base reel game outcome triggers the enhanced characteristic of the bonus reel game. For example, upon display of an enhancement symbol in a base reel game outcome, an associated metamorphic may transform to an active state which indicates that a bonus reel game with the associated enhanced characteristic has been triggered.

Accordingly, example systems and methods of the present disclosure represent a technical improvement in the field of electronic gaming. Technical improvements represented by the present disclosure include: (i) presenting Class II and Class III game outcomes as one or more outcomes of a bonus reel game having one or more enhanced characteristics; (ii) storing multiple reel sets in a memory that are each linked to either a base reel game, a bonus reel game, or one or more bonus reel games having enhanced characteristics in varying combinations; (iii) applying one or more enhanced characteristics to the bonus reel game in varying combinations concurrently; (iv) transforming metamorphics based on the application of one or more enhanced characteristics to the bonus reel game in varying combinations; (v) increasing the flexibility and variability in presenting award values of a game outcome as one or more bonus reel game outcomes to facilitate increasing player interest and excitement; (vi) providing multiple award opportunities during a bonus reel game as special symbols and winning symbol combinations, increasing a number of pay lines for winning symbol combinations and/or a number of positions in the reel matrix for a special symbol to be displayed, and/or applying multipliers to winning bonus reel game outcomes; (vii) displaying immediate bonus reel game feedback to a player; and/or (viii) displaying potential reward opportunities to the player for a bonus reel game in advance of triggering the bonus reel game. Additional and/or alternative technical improvements may exist.

Certain technical problems are associated with the technical improvements provided by the systems and methods described herein. For example, presenting primary game outcomes as outcomes of a bonus reel game having one or more enhanced characteristics raises a number of technical challenges in gaming technology and game design. In Class III games, increasing the randomness of game outcomes and award opportunities includes complying with jurisdictional requirements, such as, for example, maintaining designated return-to-player (RTP) percentages and controlling payout volatility. In Class II games, facilitating partitioning or distributing an award value of a Class II game outcome using multiple variations of a bonus reel game having one or more enhanced characteristics, and any combination thereof, introduces complexities in processing and game design. The bonus reel game having one or more enhanced characteristics must be capable of displaying a bonus reel game outcome the corresponds to the Class II game outcome. Thus, for any given Class II game outcome, efficient and accurate identification and selection of appropriate variation(s) of the bonus reel game having one or more enhanced characteristics for displaying the corresponding Class II game outcome is required. Moreover, in Class II and Class III games, visual changes (e.g., of metamorphics) on any graphical interfaces should be displayed with adequate processing speed and the visual effects should indicate to a player of the enhanced bonus reel game characteristics without burdening a player with determining how a bonus reel game and/or the enhanced characteristics have been triggered. These technical problems are unique to gaming technology that implements the technical improvements described herein, and are not presented in conventional gaming devices that do not offer the flexibility and variability in presenting primary game outcomes as outcomes of a bonus reel game having one or more enhanced characteristics as provided herein. As conventional gaming devices have not faced the technical problems presented by the gaming technology described herein, no technical solution to these technical problems exists.

In view thereof, in order to solve the technical problems presented by the technical improvements described herein, the systems and methods described herein provide various tools for presenting primary game outcomes as outcomes of a bonus reel game having one or more enhanced characteristics in a computationally-effective way, while also enabling improved usability and enhanced user experience. For example, in example implementations, a database or table may store possible winning outcomes of the primary game and associate the winning outcomes with outcomes of bonus reel games having one or more enhanced characteristics. For each winning outcome of the primary game, multiple outcomes of bonus reel games having different types of enhanced characteristics may be stored in the database or table. The winning outcomes may be tagged in the table or database with an identifier that enables a game controller or processor to identify the outcomes of the bonus reel games having different enhanced characteristics associated with each winning outcome. Thus, when a winning outcome of the primary game occurs, the game controller and/or processor may efficiently and accurately identify the different outcomes of bonus reel games having different enhanced characteristics that can present the winning outcome by querying the database or table. The game controller and/or processor may then randomly select one or more outcomes from the identified outcomes of the bonus game having one or more enhanced characteristics to present the winning outcome of the primary game. This provides computationally-effective selection of a particular bonus reel game having one or more enhanced characteristics, and enables the flexibility and variability in presenting primary game outcomes. Other technical solutions will be apparent as the description proceeds.

Accordingly, the example systems and methods facilitate improving gaming device operation, capability, and user interface features at least by implementing the following features: causing display of a base reel game including a reel matrix for a plurality of reels; controlling the plurality of reels to display a base reel game outcome that includes a combination of symbols in the reel matrix corresponding to a primary game outcome; determining that the primary game outcome satisfies a bonus game condition to trigger a bonus reel game that includes one or more free spins and an enhancement condition to trigger at least one enhanced characteristic of the bonus reel game; in response to the bonus game condition and the enhancement condition each being satisfied, identifying outcomes for the one or more free spins of the bonus reel game having the at least one enhanced characteristic; randomly selecting an outcome for each of the one or more free spins from the identified outcomes; and/or causing display of the bonus reel game having the at least one enhanced characteristic, wherein the bonus reel game includes display of the randomly selected outcome for each of the one or more free spins.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
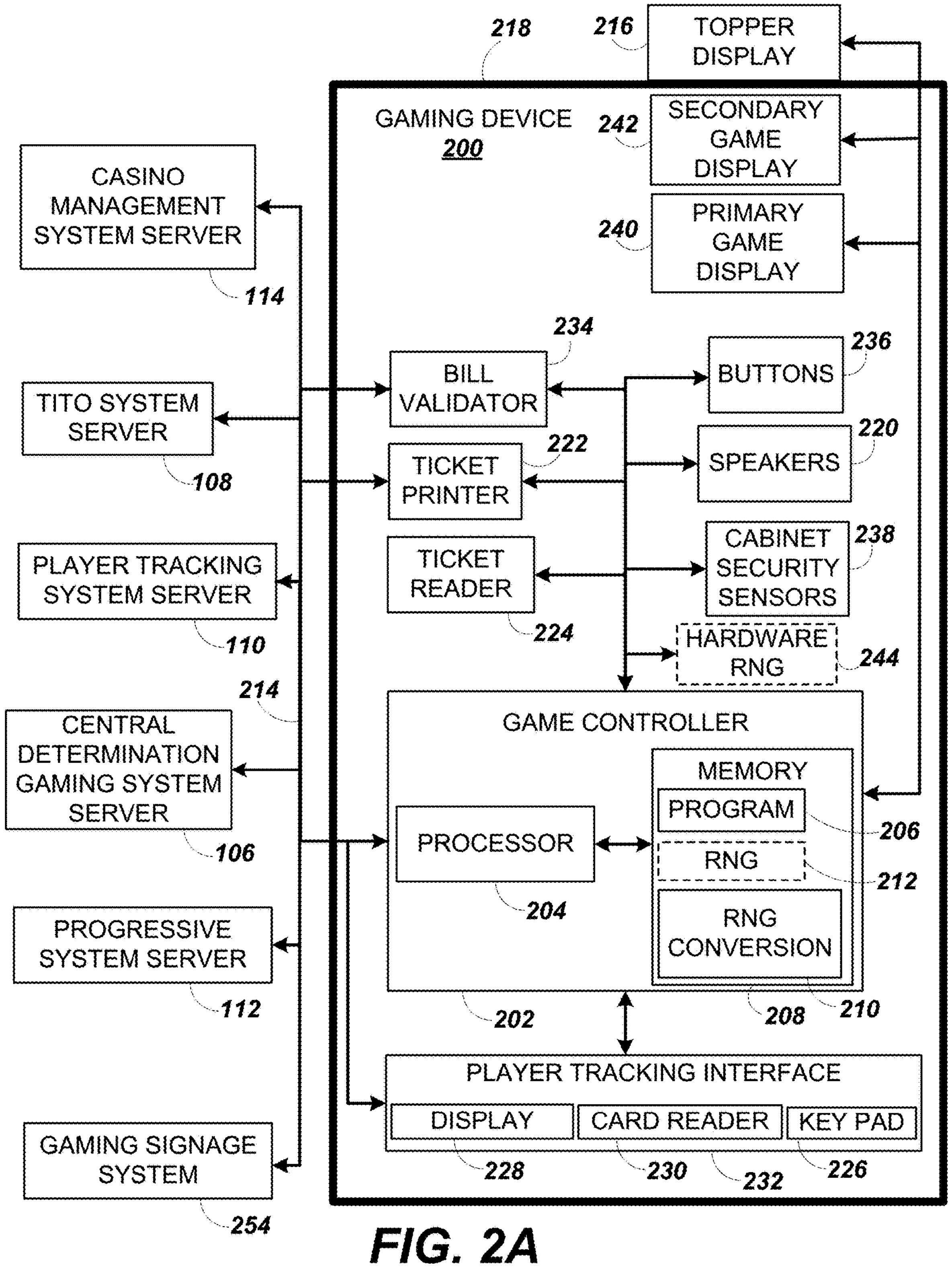
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display

240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
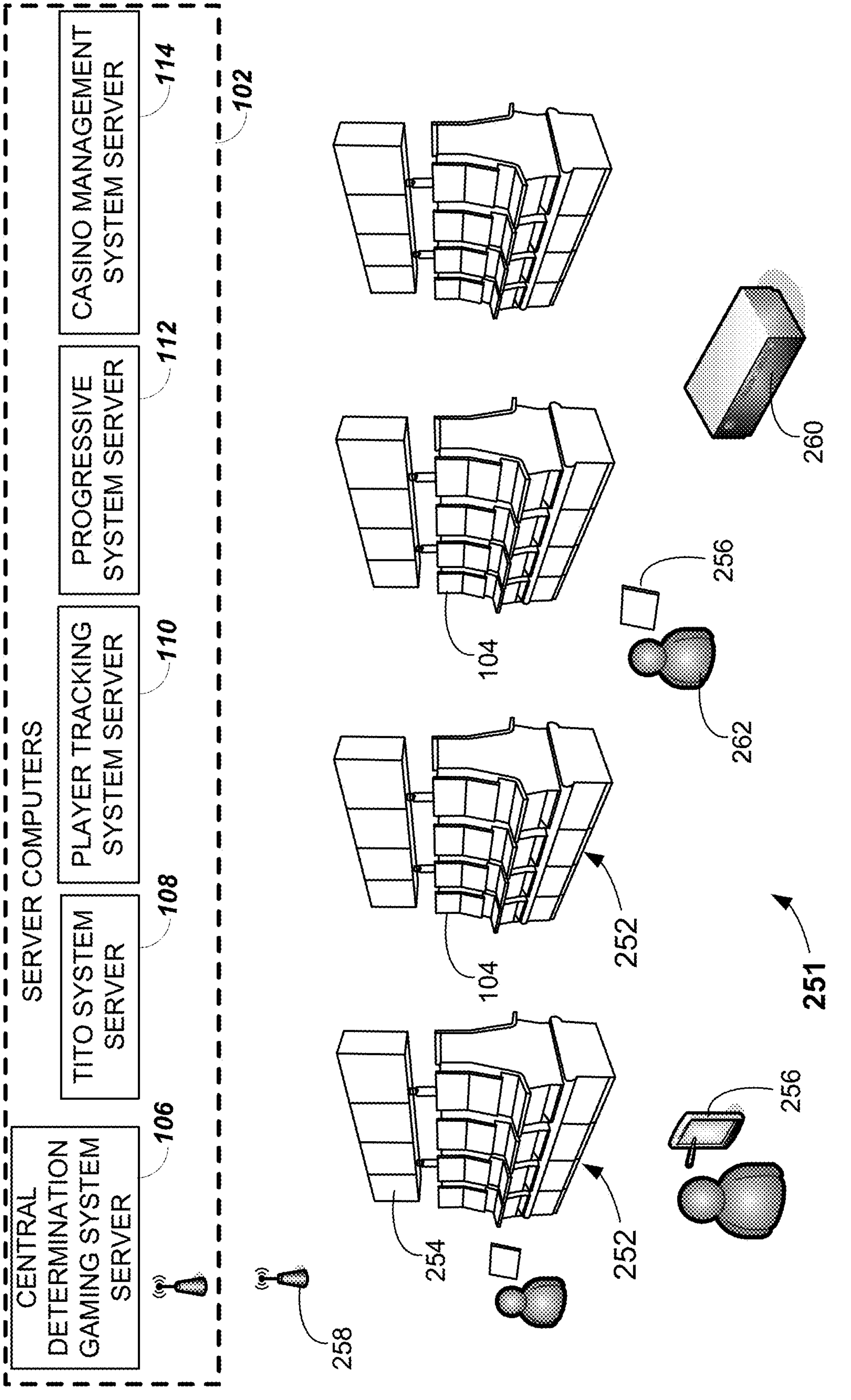
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
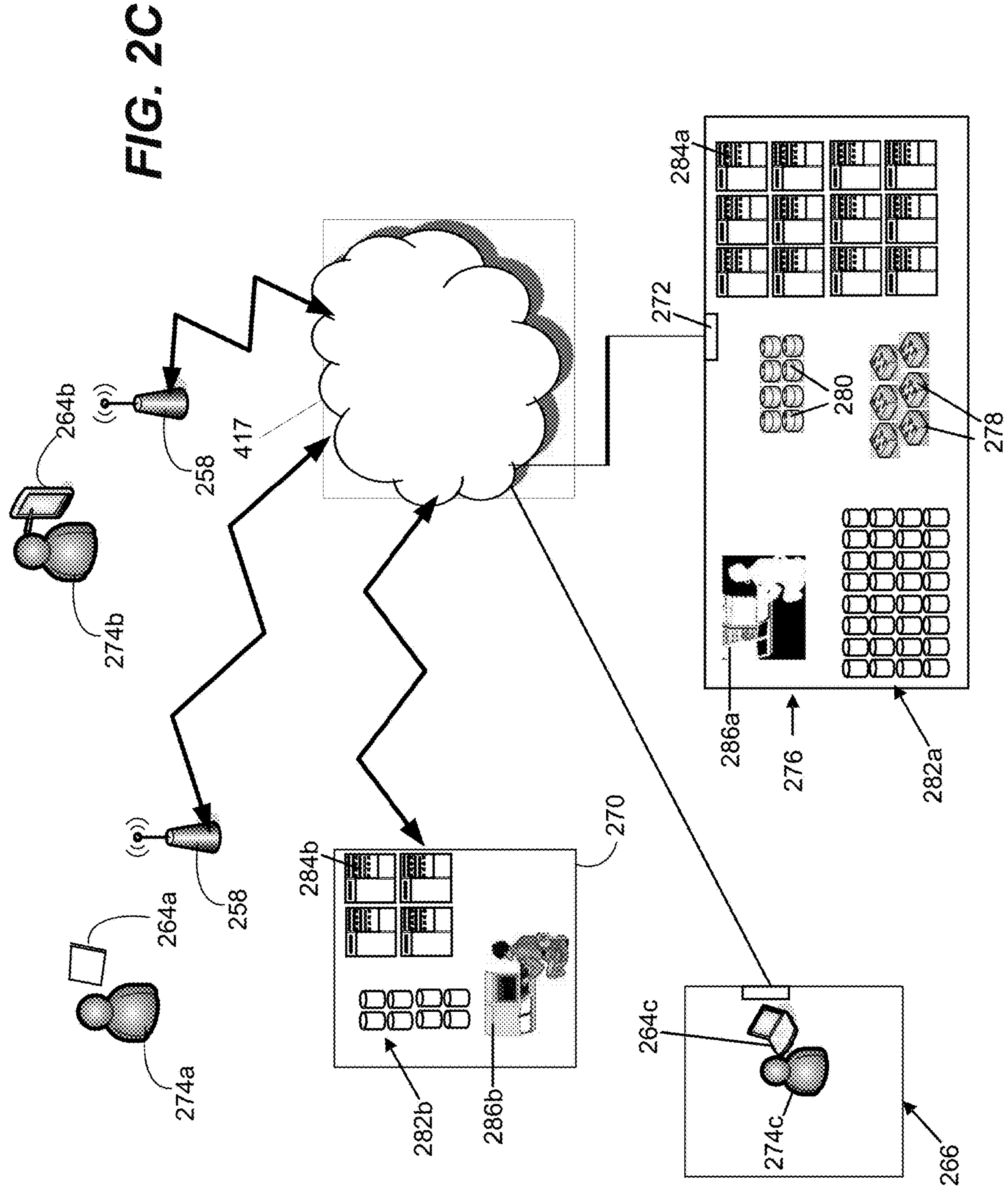
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 570*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
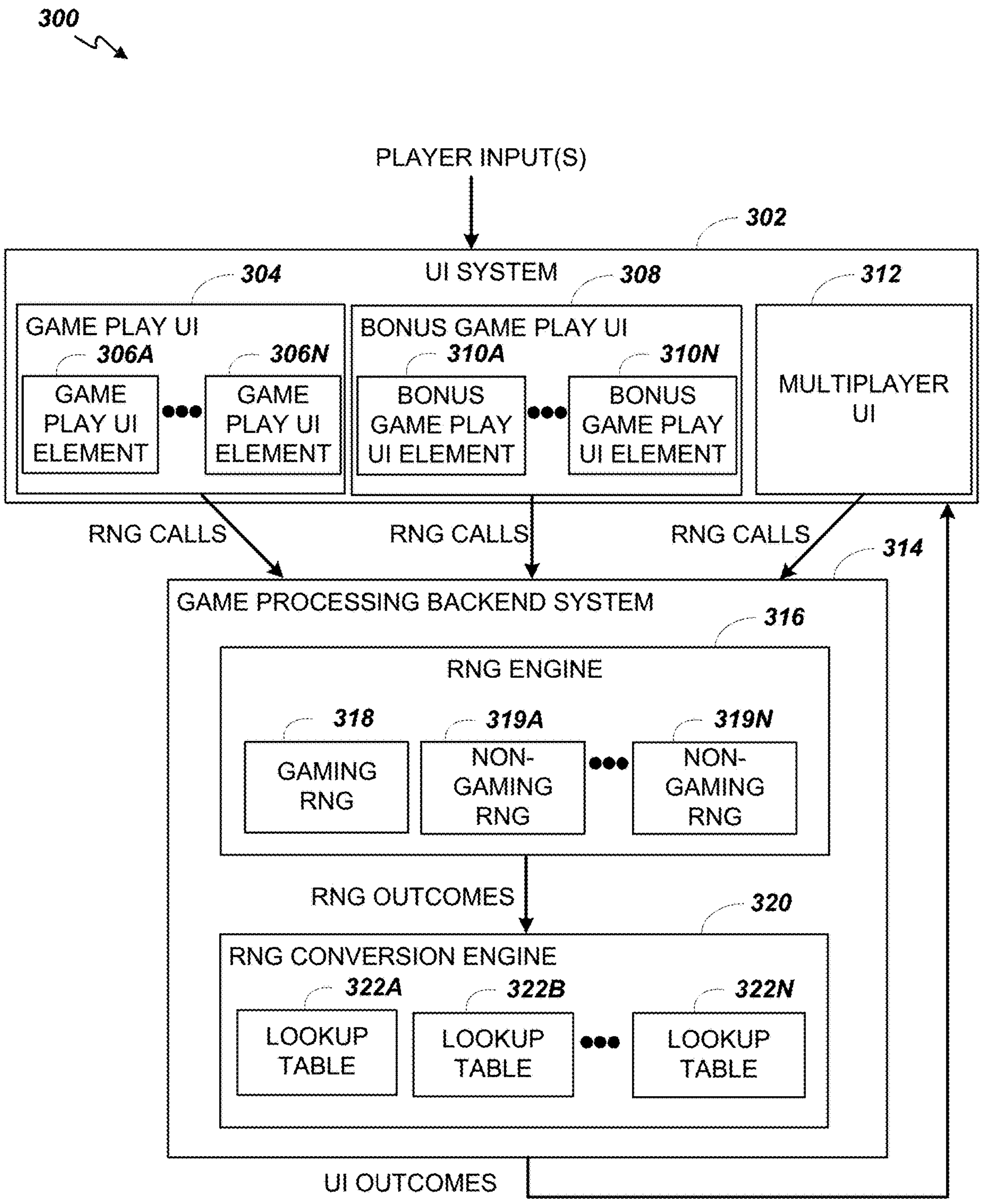
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

Figure 4:
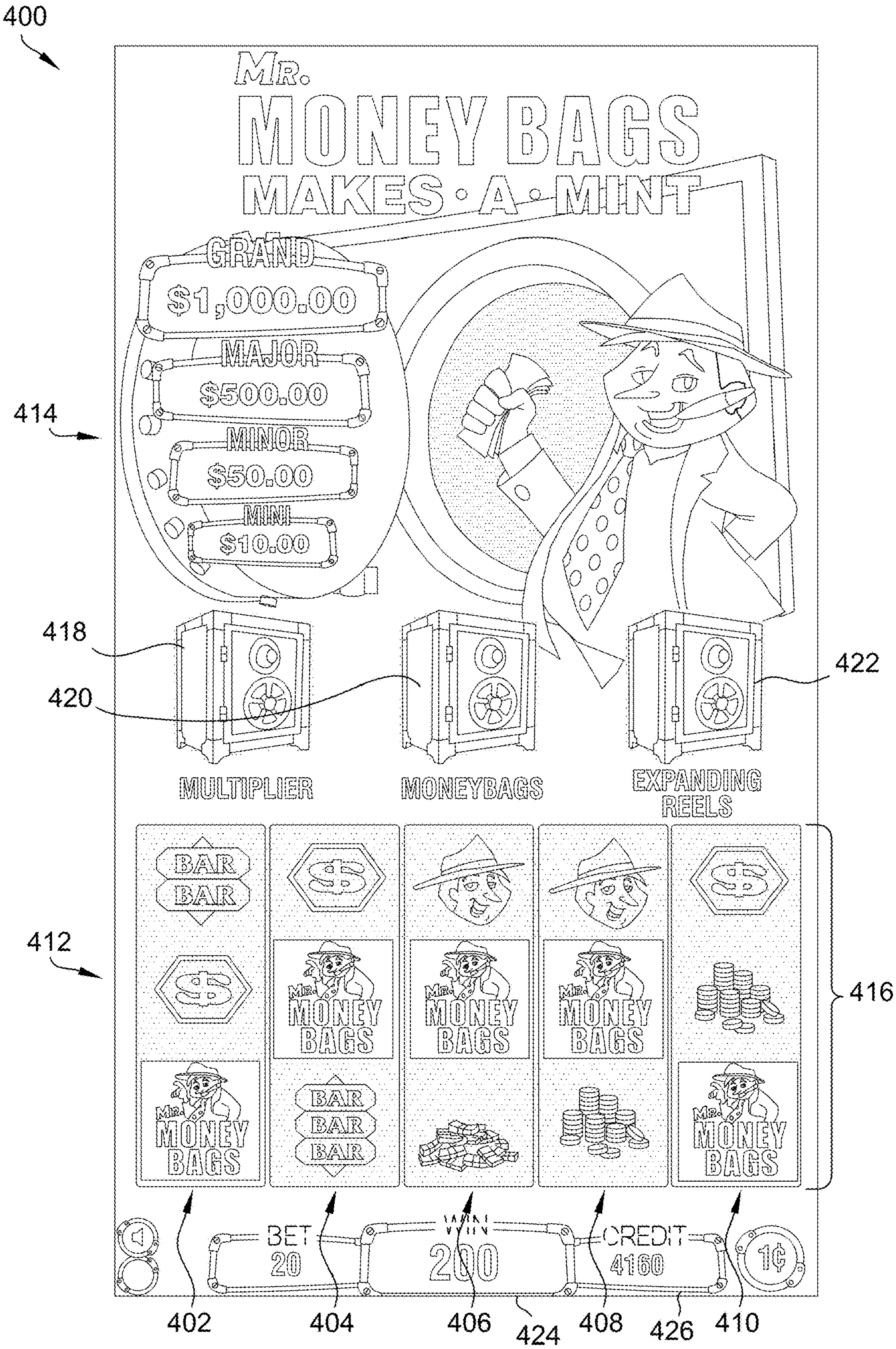
FIG. 4 illustrates an example user interface or screenshot of a base reel game of an example electronic game in accordance with the present disclosure.

FIG. 4 is a user interface or screenshot of an example base reel game 400 played on a gaming device (e.g., gaming devices 104A-104X in FIG. 1, and/or gaming device 200 and/or mobile gaming device 256 in FIG. 2). Specifically, FIG. 4 shows a base reel game 400, in which a base reel game outcome corresponds to (e.g., presents, represents, and/or is determined from) an output of the gaming device. The output may be a primary game outcome determined in response to a wager received from a player. In example implementations, described in further detail herein, the primary game outcome is a Class II (e.g., bingo) game outcome. Although the example implementations are described herein primarily with reference to presenting outcomes of a Class II (e.g., bingo) game using the base reel game 400, in other implementations, the base reel game outcome may be and/or corresponds to an outcome of a Class III or Las-Vegas style game. In various implementations, the base reel game 400 may be implemented to present an outcome of any suitable game of chance. Specific details of the type of primary game outcomes presented using the base reel game 400 are not central to an understanding of the present disclosure. However, additional detail related to at least one implementation (e.g., an implementation employing the base reel game 400 to present a primary bingo-based or Class II game outcome) may be obtained with reference to U.S. Published Patent Application No. 2012/0270638, filed Apr. 20, 2011, and entitled GAMING MACHINE WITH FREE PLAY BONUS MODE PRESENTING ONLY WINNING OUTCOMES, the disclosure of which is hereby incorporated by reference herein in its entirety.

The base reel game 400 may be initiated on a gaming device 104A-104X and 200. Specifically, a player may fund the base reel game 400 via bill validator 234 and/or ticket reader 224. Once funded, the base reel game 400, which includes a first plurality of reels 402, 404, 406, 408, and/or 410, each including a plurality of symbols, may appear on a primary display 412. The first plurality of reels 402-410 may be physical reels and/or virtual reels. As used herein, physical reels are mechanical in nature and may be physically rotated during gameplay. In contrast, virtual reels are rendered or visually created by game controller 202 on a display, such as primary game display 240, and are merely animated to give the appearance of being spun. The first plurality of reels 402-410 of the example base reel game 400 include five reels. In other examples, the number of reels may range from one reel to five or more reels in number.

The base reel game 400 may be played on several displays, such as the primary display 412 and a secondary display 414. However, in other implementations, the base reel game 400 may be played on a single display and/or on greater than two displays. In the example shown in FIG. 4, the base reel game 400 includes a first reel matrix 416 on the primary display 412. The first reel matrix 416 includes a plurality of symbol positions arranged in a plurality of rows and a plurality of columns. The first reel matrix 416 may also therefore be referred to as a "matrix of symbol positions." While, in the example shown in FIG. 4, the first reel matrix 416 is displayed on the primary display 412, the first reel matrix 416 may appear in other locations on an EGM 104A-104X and/or on other displays, such as, for example, the secondary display 414, a display of button deck 120, and the like.

In the example embodiment, the first reel matrix 416 is a 3×5 matrix having three rows and five columns. As a result, in the example embodiment, the first reel matrix 416 includes fifteen symbol positions. In other implementations, the first reel matrix 416 may be any size (e.g., 2×2, 3×3, 4×4, 10×10, etc.), and a number of symbol positions in the first reel matrix 416 may vary depending upon a number of rows and columns displayed in the first reel matrix. In some implementations, the first reel matrix 416 may be replaced by one or more mechanical reels, and the implementations described herein work equally well with mechanical reels as with the first reel matrix 416. Each row of the first reel matrix 416 may be designated by a row number (e.g., "1," "2," "3," etc.). Each column of the first reel matrix 416 may be designated by a column letter (e.g., "A," "B," "C," "D," "E," etc.). Each symbol position of the first reel matrix 416 may therefore be designated by a symbol position identifier comprising a row number (e.g., "1," "2," "3," etc.) and a column letter (e.g., "A," "B," "C," "D," "E," etc.). For example, the upper-left-most symbol position, occurring at the intersection of row 1 and column A, may be designated by the symbol position identifier "1A."

As described herein, during play of the base reel game 400, symbols may be selected (e.g., such as from the first plurality of reels 402-410) and displayed in the symbol positions of each column of symbols within the first reel matrix 416. Although not central to an understanding of the present disclosure, each of the first plurality of reels 402-410 may include a plurality of symbols arranged in a vertical column. A number of symbols of each reel, corresponding to the number of rows of the first reel matrix 416, is displayed in a column of symbol positions within the first reel matrix 416 during play of the base reel game 400. To display symbols from a reel within the first reel matrix 416, processor 204 may simulate rotation or spinning of one or more of the plurality of reels 402-410 within a respective column of the first reel matrix 416. Here again, however, mechanical reels having physical reel strips may be used as well. When a respective reel is simulated to halt or stop within an associated column, one or more symbols may be displayed from the reel strip in the symbol positions of the column. The symbols displayed after spinning and stopping each reel strip in a respective column of the first reel matrix 416 may be referred to herein as a "reel outcome" or a "base reel game outcome" or a "base game outcome." More broadly, an "outcome" of a reel game, such as a base reel game (e.g., the base reel game 400) or a bonus reel game (e.g., a bonus reel game 500 described in more detail herein), refers to the symbols displayed in a reel matrix after reel strips are spun and stopped. Thus, a rotation and stopping of a plurality of reel strips (also referred to herein as a "spin and stop sequence") may be simulated by processor 204 within the columns of the first reel matrix 416 to cause a reel outcome, including a plurality of symbols, to be displayed from the plurality of reel strips within the columns of the first reel matrix 416.

In operation, the reel outcome presented during play of the base reel game 400 corresponds to (e.g., presents, represents, and/or is determined from) a primary game outcome. For example, the reel outcome may correspond to a primary or underlying Class II game, or the reel outcome may be determined randomly (e.g., in Class III games).

In the example implementation, the reel outcome of the base reel game 400 corresponds to (e.g., presents, represents, and/or is determined from) a Class II (e.g., bingo) game outcome. In some implementations, a player and/or a gaming device (e.g., gaming devices 104A-104X and 200) may be provided with a bingo card, such as by a bingo gaming system server (e.g., the server 106). For example, a player may be provided a new bingo card each time a "Spin" or "Play" button is pressed by the player (e.g., via user interface), provided the player has made a wager. In some examples, more than one bingo card may be generated in response to wager. A bingo number listing (also referred to as a "ball call") may be randomly generated, such as by bingo gaming system server 106. The bingo card may be compared to the current bingo number listing, and numbered cells on the bingo card that match numbers in the bingo number listing may be marked or "daubed" on the bingo card. Finally, the marked or daubed bingo card may be evaluated against a paytable of winning bingo patterns.

The bingo number listing may be continually generated until a maximum amount of numbers are listed (e.g., seventy-five numbers listed) or until a game-ending pattern is awarded to a player participating in the bingo game. A typical game-ending pattern may be a bingo card blackout pattern, in which each of the numbers of a bingo card match a number displayed in the bingo number listing. Other game-ending patterns are also possible. When the game-ending pattern is awarded, the bingo number listing is reset, and the process repeats. In some examples, a single play of the bingo game includes a wager, a bingo card, a bingo number listing, a matching of the numbers called with those on a bingo card, a determination of a bingo game outcome, and a presentation of an associated award, if any. As described herein, the presentation of the associated award is implemented using the base reel game 400 and, if conditions are satisfied by the award, the bonus game 500, as described in more detail below.

To determine a bingo game outcome, the bingo card may be daubed by the game controller 202 (e.g., via the processor 204) based upon a list of numbers included in the ball call. Once the bingo card is daubed, the game controller 202 may compare the numbers daubed on the bingo card to every winning pattern in a database of winning patterns to determine one or more winning outcomes of the bingo game outcome. As those of skill will appreciate, the number of winning patterns may be determined based upon the ball call. The daubed bingo card may also be displayed (e.g., on the primary display 412 or the secondary display 414), such as, for example, by highlighting each daubed number, and the ball call may be displayed as well. Moreover, a table or database of winning patterns may be stored in a computer memory of any of EGMs 104A-104X or 200, such as memory 208, which may be a tangible, non-transitory, computer-readable memory. If the daubed bingo card does not include a pattern that matches a pattern in the database of winning patterns, then a losing bingo outcome is determined, and no award may be provided or presented to the player. If the bingo card does include a pattern that matches a pattern in the database of winning patterns, then a winning bingo outcome is determined, and an award may be presented to the player, as described herein.

The bingo game outcome may, in some instances, include a plurality of winning patterns. Different winning patterns may be associated with different awards. The award for a winning bingo game outcome may be based on an amount wagered, an associated bingo game paytable, an associated set of rules for the bingo game, a probability (and/or likelihood) of achieving a particular bingo pattern/combination, an amount of bingo numbers needed to achieve the particular bingo pattern/combination, and/or other considerations. In some examples, the player may be awarded for multiple patterns (e.g., all winning patterns) that are matched when the daubed bingo card is evaluated against the database of winning patterns. In some examples, the player may be awarded for only the highest priority pattern (e.g., the highest paying winning pattern) that is matched. In some examples, during play of a Class II game, a player is provided or selects a single bingo card for multiple plays of the bingo game, with a new bingo number listing generated for each play of the bingo game. Other methods of play of a Class II bingo game are also possible and are within the scope of this disclosure.

The bingo game outcome may be presented to the player via a spinning reel game simulation. That is, for each play of the bingo game, the bingo game outcome is presented as a reel outcome or a sequence of reel outcomes in a reel game. In the example shown in FIG. 4, a bingo game outcome is presented by the base reel game 400 simulation as a spin and stop sequence or multiple spin and stop sequences of the plurality of reels 402-410 in the first reel matrix 416. The spin and stop sequence(s) and associated outcome(s) of a reel game (e.g., the base reel game 400) that present the bingo game (or another Class II game) outcome may also be referred to as a "façade" or a "script." A table or database may be stored in a computer memory of any of EGMs 104A-104X or 200 and/or the server 102, such as memory 208, that associates bingo game outcomes with façades for presenting the bingo game outcomes. The game controller 202 (e.g., via the processor 204) may thereby query the table or database to identify façades, which each contain one or more spin and stop sequence(s) and associated outcome(s) of the reel game, to present a bingo game outcome. The processor 204 may randomly select from multiple façades identified for a given bingo game outcome. For example, for a given bingo game outcome, a number of façades, e.g., five, ten, fifteen, or any other number of different ways (façades), may exist and be stored in the table or database to present the bingo game outcome. A façade may be randomly selected from multiple identified façades for a given bingo game outcome, for example, based upon a random number provided by the RNG 212. When a façade is selected by the processor 204 to present a bingo game outcome, the processor 204 may control the reel game to present the one or more spin and stop sequence(s) and associated outcome(s) contained in the façade.

In the example implementation, for a given bingo game outcome, the processor 204 selects a façade for presenting the bingo game outcome. Based on the selected façade, the processor 204 controls the base reel game 400 to cause display of one or more spin and stop sequences of the plurality of reels 402-410 in the first reel matrix 416 and the associated outcome(s) of the base reel game 400. One or more combinations of symbols and/or one or more special symbol types in the outcome of the base reel game 400 may be associated with an award value that is equal to an award value of the bingo game outcome. Similarly, a losing bingo game outcome may be displayed as a losing outcome of the base game 400 (e.g., no winning symbol combinations or winning special symbol types are displayed).

To illustrate, the base reel game 400 may be initiated in response to a bingo game outcome that includes a winning pattern having an award value of 200 credits. The processor 204 queries the table or database to identify façades for presenting the winning pattern and/or the award value as one or more spin and stop sequences of the plurality of reels 402-410 in the first reel matrix 416 and the associated outcome(s) of the base reel game 400. The processor 204 then selects one of the identified façades for the bingo game outcome and initiates a play of the base reel game 400. During the base reel game 400, based on the selected façade, the processor 204 causes the first plurality of reels 402-410 to spin and stop to display a combination of symbols that include a winning symbol combination corresponding to a 200 credit award value (shown in FIG. 4) that matches the award value of the winning bingo game outcome. The award value is then displayed in a win meter 424 and subsequently added to a credit meter 426. The win meter 424 displays an immediately awarded value for an outcome the base reel game 400, and the credit meter 426 displays a credit balance (calculated as a sum total of credits input and awards accrued minus wagers placed) accrued until a player cashes out. Each of the win meter 424 and the credit meter 426 are shown displayed on the primary display 412, however, each may appear in other locations on an EGM 104A-104X or 200 and/or on other displays, such as, for example, the secondary display 414, a display of button deck 120, and the like.

Figure 5:
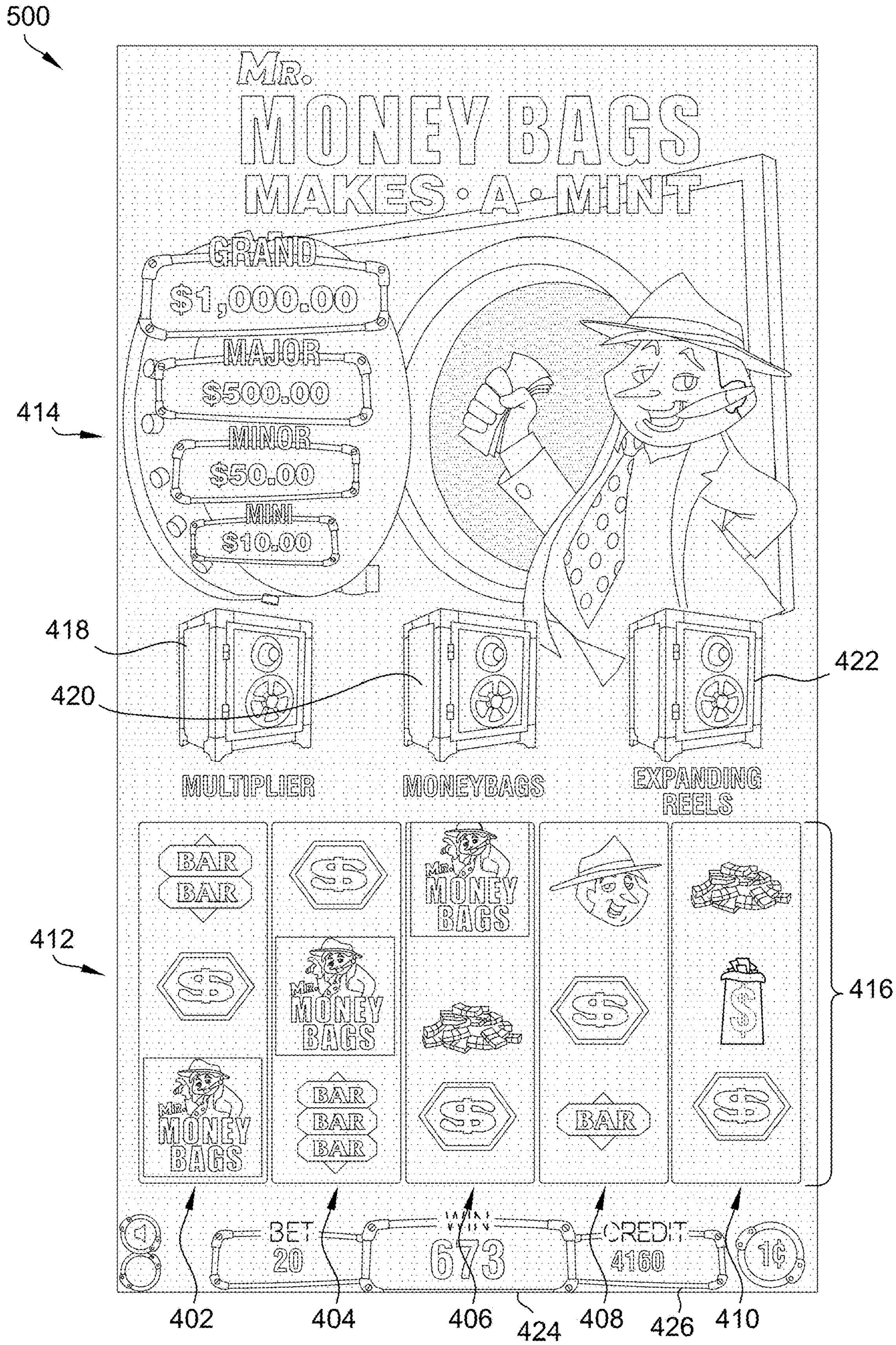
FIG. 5 illustrates an example user interface or screenshot of one implementation of a bonus reel game of the example electronic game without an enhanced characteristic in accordance with the present disclosure.

Referring to FIG. 5, a user interface or screenshot of an example bonus game 500 initiated after play of the base reel game 400 is displayed. The bonus game 500 is triggered by the primary game outcome satisfying a bonus game condition, described in further detail below. In the example implementation, the bonus game 500 may include a number of free spins of the first plurality of reels 402-410 in the first reel matrix 416. Thus, the bonus game 500 may also be referred to herein as a bonus reel game 500 or a free spin bonus game 500. In various implementations, the bonus game 500 may be played as a primary or base game and/or as a bonus game that is initiated after play of a primary game (e.g., the base reel game 400). In other words, the functionality described herein with respect to free spin bonus game 500 may be implemented in any primary game as well as in any bonus game. Moreover, the bonus game 500 is not limited to a reel game, and may be implemented as another suitable wagering game. However, in the illustrated implementation, the bonus game 500 is a bonus reel game that includes one or more free spins, and is initiated after play of the base reel game 400.

The bonus game 500 is triggered in response to a game controller (e.g., the game controller 202) determining that a bonus game condition is satisfied by the primary game outcome. The primary game outcome may include a number of (e.g., multiple) awards or winning game outcomes (e.g., winning combinations, patterns, etc.). For example, the game controller 202 may determine that a bingo game outcome includes a number of (e.g., multiple) winning bingo patterns. The bonus game condition may be satisfied by a predefined or preselected number of awards or winning game outcomes of the primary game outcome. For example, in Class II bingo game implementations, the bonus game condition may be a predefined or preselected number of winning bingo patterns included in the bingo game outcome. The game controller 202 may identify and translate the number of winning patterns occurring on the bingo card to a number of free spins in the free spin bonus game 500. For example, if a number n winning patterns are identified on the bingo card, the game controller 202 may award a number n free spins during the free spin bonus game 500. Likewise, the game controller 202 may not trigger free spin bonus game 500 until the number of winning patterns exceeds a predefined or preselected number of winning patterns (e.g., two or more winning patterns). To this end, the game controller 202 may, in some implementations, count, or determine a number of, winning patterns and/or free spins awarded.

In various implementations, a bonus game condition may include any suitable trigger condition, such as, for example, generation by RNG 212 of an RNG outcome (e.g., a random number within a range of random numbers) and performing a lookup operation to map the random number to a decision as to whether the bonus game condition is satisfied. The RNG outcome for mapping to the decision as to whether the bonus game condition is satisfied may be generated after each play of a base game (e.g., the base reel game 400), or may itself be randomly generated based on an additionally generated RNG outcome. Additionally and/or alternatively, in a Class III implementation, the bonus game condition may be satisfied when a preselected or predefined symbol combination and/or a preselected or predefined symbol type (e.g., a special symbol) is displayed on the first plurality of reels 402-410 in an outcome the base reel game 400. For example, a symbol combination and/or symbol type associated with a game award that is greater than or equal to a predetermined award value may satisfy the bonus game condition. In some implementations, a preselected or predefined symbol combination and/or symbol type being displayed in an outcome of a base game (e.g., the base reel game 400) may generate an RNG outcome that is mapped to a decision as to whether the bonus game condition is satisfied.

In some implementations, and as described in additional detail herein, the bonus game condition may be satisfied when a number of winning patterns in a primary Class II game (e.g., a bingo game) exceeds a predefined or preselected number of winning patterns. In other implementations, the bonus game condition may be satisfied when an award associated with a bingo winning pattern is greater than or equal to a predetermined award value and/or when the predetermined award value is capable of being partitioned into or distributed across a predefined or preselected number of free spins. It will, however, be appreciated that these bonus game conditions are described by way of example only and that other bonus game conditions may be implemented as well.

When the free spin bonus game 500 is triggered, the game controller 202 may award one or more free spins of the first plurality of reels 402-410 displayed in the base reel game 400. The number of free spins awarded may be based upon any suitable criterion or group of criteria, such as, for example, the value of the random number generated by RNG 212, the symbol combination occurring on reels 402-410 in an outcome of the base reel game 400, and the like.

In another Class II implementation, the number of free spins awarded may correspond to a number of segments or partitions of a subdivided bingo game award. For example, when the bonus game condition is satisfied by a bingo game award of sufficient value (as described above), the bingo game award may be subdivided into a plurality of smaller awards, each of which may be associated with a free spin. As an example, a bingo game award of 1,000 credits may be subdivided into eight smaller awards, e.g., of 125 credits each. In other examples, the eight awards may be of different, i.e., unequal, amounts. Each of the eight smaller awards may be associated with an individual free spin, and each of these individual free spins may provide or award one of the eight smaller awards.

In at least one Class III implementation, the number of free spins awarded may correspond to a number of partitions of a subdivided game award in the Class III base game. For example, when the bonus game condition is satisfied by a primary game award of sufficient value (as described above), the game award may be subdivided into a plurality of smaller awards, each of which may be associated with a free spin, and provided in conjunction with one of the smaller sub-awards.

In another Class II or Class III implementation, each free spin may correspond to a particular game outcome, such as any winning and/or non-winning game outcome. For example, winning and/or non-winning game outcomes may, in some implementations, result in free spins. However, and in at least some implementations, only winning game outcomes may result in free spins. Moreover, as described above, in some implementations, the game controller 202 may simply (randomly) award a number of free spins.

Thus, the free spin bonus game 500 may be implemented in Class II and Class III implementations, and a bonus game condition and/or a number of free spins awarded during the free spin bonus game 500 may be variously determined. In addition, the methods for determining the bonus game condition and/or a number of free spins described above are merely illustrative, and it will be appreciated that other approaches are contemplated and within the scope of the present disclosure.

The free spin bonus game 500 may be provided with a displayed indication that the bonus game 500 is distinct from the base reel game 400. For example, the free spin bonus game 500 may be provided in conjunction with a change to an overlaid translucent or transparent colored graphic effect (shown in FIG. 5) around the first reel matrix 416, the primary display area 412, and/or the second display area 414. For instance, in one implementation, the primary display area 412 and/or the secondary display area 414 may change to include a red color overlay or a "red screen." The red screen may be displayed for the duration of the free spin bonus game 500 to let a player know that each free spin will be accompanied by an award (e.g., corresponding to an award of each of the multiple winning patterns of the bingo game outcome). In other implementations, words, symbols, letters, metamorphics, and/or other visual effects may be displayed on or adjacent the reel matrix 416, the primary display area 412, and/or the second display 414, in addition to and/or alternative to the displayed red screen.

An outcome of each free spin of the bonus game 500 may, in some implementations, correspond to an award value associated with the primary game outcome. For example, the outcome of each free spin of the bonus game 500 may correspond to a winning bingo pattern. The game controller 202 may, as a result, determine or identify (e.g., by querying a table or database stored in a memory as described below) an award value associated with an outcome of each free spin based upon the corresponding winning game outcome or award of the primary game outcome. For example, if a winning bingo pattern associated with a first free spin outcome corresponds to an award of 100 credits (e.g., determined based upon a bingo paytable), the game controller 202 may re-spin the reels during the first free spin, and control display of the reels in a first free spin outcome to provide an award in association with the first free spin outcome of 100 credits. Thus, each free spin of the reels may include display of a winning free spin outcome, and an award value of each free spin outcome may correspond to an award value associated with the winning bingo pattern (or more broadly, a winning game outcome) mapped or corresponding to the free spin.

In the example implementation, the bonus reel game 500 is simulated in conjunction with the base reel game 400 as a façade for presenting a bingo game outcome that satisfies the bonus game condition. As described above with reference to the base reel game 400, a table or database may be stored in a computer memory of any of EGMs 104A-104X or 200 and/or the server 102, such as memory 208, that associates bingo game outcomes with façades for presenting the bingo game outcomes, and the game controller 202 (e.g., via the processor 204) may query the table or database to identify façades to present a bingo game outcome. For certain bingo game outcomes, for example, those that include a predefined or preselected number of winning patterns and/or one or more winning patterns associated with a certain award value, one or more façades may exist that present the bingo game outcome as outcomes of the base reel game 400 and outcome(s) of one or more free spins of the bonus reel game 500. These bingo game outcomes satisfy the bonus game condition as they are able to be presented by one or more façades that contain outcome(s) of the base reel game 400 and outcome(s) of one or more free spins of the bonus reel game 500. The processor 204 may select a façade for presenting the bingo game outcome that satisfies the bonus game condition and, based on the selected façade, the processor 204 causes display of one or more spin and stop sequences of the plurality of reels 402-410 in the first reel matrix 416 and the associated outcome(s) of the base reel game 400 and one or more free spins of the plurality of reels 402-410 in the first reel matrix 416 and the associated outcome(s) of the bonus reel game 500. One or more combinations of symbols and/or one or more special symbol types in the outcomes of the base reel game 400 and the bonus reel game 500 may be associated with an award value that is equal to an award value of the bingo game outcome.

To illustrate, the bingo game outcome may include multiple winning patterns associated with a 10 credit, a 100 credit, and a 1000 credit pattern win. The processor 204 queries the table or database to identify façades for presenting the winning patterns and/or the award value(s) as one or more spin and stop sequences and the associated outcome(s) of the base reel game 400 and one or more free spins and the associated outcome(s) of the bonus reel game 500. For example, one or more façades may exist that contain a spin and stop sequence and associated outcome of the base reel game 400 for presenting the 10 credit pattern win and one or more free spins and the associated outcome(s) of the bonus reel game 500 for presenting the 100 credit pattern win and the 1000 credit pattern win, and the processor 204 identifies these façades by querying the table or database. The processor 204 then selects (e.g., randomly selects based upon a random number provided by the RNG 212) one of the identified façades for the bingo game outcome and, in response and based on the selected façade, the processor 204 causes display of the spin and stop sequence and associated outcome of the base reel game 400 for presenting the 10 credit pattern win and one or more free spins and the associated outcome(s) of the bonus reel game 500 for presenting the 100 credit pattern win and the 1000 credit pattern win.

A total award value accrued during the base reel game 400 and the free spins of the bonus reel game 500 may be displayed, such as, for example, in the win meter 424. The award value displayed in the win meter 424 during the free spin bonus game 500 may increase incrementally (e.g., as determined by the selected façade) after each free spin outcome to build player excitement, such as, for example, where the player knows that a number of free spins have been awarded based upon the appearance of the free spin bonus game 500, but where the player does not know specifically how many free spins have been awarded. In some implementations, the processor 204 may control (e.g., as determined by the selected façade) the free spin sequence during the free spin bonus game 500 such that an equal or greater award value is presented after each successive free spin to facilitate further increasing player excitement. Once the number of free spins awarded during the bonus game 500 has been reached, the total award value may be added to the credit meter 426 and the free spin bonus game 500 is completed. Upon completion of the bonus game 500, the displayed indication (e.g., the red screen) may be removed to visually inform the player that the bonus game 500 has been completed.

The features of the free spin bonus game 500 (e.g., the displayed red screen and/or the progressive display of increasing award values during successive spins of the bonus game 500) may only facilitate increasing player excitement to a limited extent. Still referring to FIG. 5, during the bonus game 500, each free spin includes a spin and stop sequence of the first plurality of reels 402-410 in the first reel matrix 416. Even though the player may anticipate a winning outcome for each free spin, the player may not perceive that the bonus game 500 provides any additional opportunity for a winning outcome beyond the opportunities provided during the base reel game 400.

Accordingly, with additional reference to FIGS. 6-15 generally, the free spin bonus game 500 may include enhanced characteristics that increase the flexibility in presenting winning outcomes during the number of free spins that correspond to winning outcomes or awards of the primary game outcome (e.g., a bingo game outcome). The enhanced characteristics of the free spin bonus game 500 facilitate increasing player excitement during the bonus game 500 as each enhanced characteristic is perceived as providing an additional opportunity for a winning free spin outcome (e.g., by expanding the reel matrix and/or spinning a different set of reels that include special symbols associated with a credit or monetary value when displayed), and/or an increased monetary value awarded for a winning free spin outcome (e.g., by applying a multiplier to each winning outcome).

In the example implementation, the enhanced characteristics of the bonus game 500 include an award multiplier characteristic (described in further detail below with reference to FIGS. 6-8), a jackpot characteristic (described in further detail below with reference to FIGS. 9-12), and an expanding reels characteristic (described in further detail below with reference to FIGS. 13-15). The bonus game 500 may include one or any combination of two or more of the enhanced characteristics. Although the enhanced characteristics are described with respect to an award multiplier characteristic, a jackpot characteristic, and an expanding reels characteristic, the bonus game 500 may include any suitable enhanced characteristics that provide an additional or alternative award option during the bonus game 500 beyond display of winning symbol combinations of the first plurality of reels 402-410 in the first reel matrix 416 and/or a nominal credit value awarded for each winning symbol combination that are available during the base reel game 400. As a result, although a variety of award options based on the enhanced characteristics of the bonus game 500 are described herein, it will be appreciated that any suitable award option and/or enhanced characteristic may be presented and/or offered in conjunction with the free spin bonus game 500 within the scope of the present disclosure.

As described above, the bonus game 500 is triggered in response to the game controller 202 (e.g., via the processor 204) determining that the primary game outcome satisfies a bonus game condition (e.g., a preselected or predetermined number of winning patterns included in and/or a total award value of a bingo game outcome). The bonus game 500 having one or more enhanced characteristics is triggered in response to the game controller 202 further determining that the primary game outcome also satisfies an enhancement condition.

In various Class III implementations, an enhancement condition may include any suitable trigger condition, such as, for example, generation by RNG 212 of an RNG outcome and performing a lookup operation to map the random number to a decision as to whether the enhancement condition is satisfied. The RNG outcome for mapping to the decision as to whether the enhancement condition is satisfied may be generated after each play of a base game (e.g., the base reel game 400), or may itself be randomly generated based on an additionally generated RNG outcome. The RNG outcome for determining whether the enhancement condition is satisfied may be generated in conjunction with determining whether the bonus game condition is satisfied (e.g., a single RNG outcome may be utilized to determine whether each condition is satisfied) or may be an additional RNG outcome generated in response to the bonus game condition being satisfied. Additionally and/or alternatively, in a Class III implementation, the enhancement condition may be satisfied when a preselected or predefined symbol combination and/or a preselected or predefined symbol type (e.g., a special symbol) is displayed on the first plurality of reels 402-410 in an outcome the base reel game 400. A preselected or predefined symbol combination and/or symbol type may satisfy both the bonus game condition and the enhancement condition, or different symbol combinations and/or symbol types may independently satisfy the bonus game condition and the enhancement condition. In some implementations, a preselected or predefined symbol combination and/or symbol type being displayed in an outcome of a base game (e.g., the base reel game 400) may generate an RNG outcome that is mapped to a decision as to whether the enhancement condition is satisfied. The lookup tables utilized for lookup operations performed using generated RNG outcomes to determine whether the enhancement condition is satisfied and/or to determine outcomes of the base reel game 400 that determine whether the enhancement condition is satisfied may suitably be weighted to control randomness and payout volatility by controlling the overall "hit rate" of the enhancement condition being satisfied.

In various Class II implementations, an enhancement condition may be satisfied if the game controller 202 (e.g., via the processor 204) determines that an outcome of the primary Class II game can be presented as outcome(s) of free spin(s) of the bonus game 500 having one or more enhanced characteristics. The determination of whether an enhancement condition is satisfied by the bingo game outcome may be performed after a number of free spins is determined for the bonus game 500, or may be performed in conjunction with determining a number of free spins to award. In particular, during or after determining that a bonus game condition is satisfied by the primary game outcome, the processor 204 may determine that one or more winning combinations of the primary game outcome satisfy the bonus game condition and determine whether outcome(s) of one or more free spins of the bonus game 500 having one or more enhancements may be presented that correspond to the one or more winning combinations.

As described above, in the example implementation, the bonus reel game 500 is simulated in conjunction with the base reel game 400 as a façade for presenting a bingo game outcome that satisfies the bonus game condition. The enhancement condition is satisfied where the bingo game outcome is associated with one or more façades that present the bingo game outcome as outcomes of the base reel game 400 and outcome(s) of one or more free spins of the bonus reel game 500 having one or more enhanced characteristics. As described above, the façades may be stored in a table or database in a computer memory of any of EGMs 104A-104X or 200 and/or the server 102, such as memory 208, and the game controller 202 (e.g., via the processor 204) may query the table or database to identify façades that contain one or more free spin outcomes of the bonus reel game 500 having one or more enhanced characteristics. The processor 204 may query the same or a different database or table to identify façades that contain one or more outcomes of the base game 400 for the bingo game outcome, façades that contain one or more free spin outcomes of the bonus reel game 500 without an enhanced characteristic, and façades that contain one or more free spin outcomes of the bonus reel game 500 having one or more enhanced characteristics. If the processor 204, based on the query, maps the bingo game outcome to one or more façades containing free spin(s) and associated outcome(s) of the bonus game 500 having one or more enhanced characteristics, the processor 204 may determine that the associated enhancement condition is satisfied by the bingo game outcome. The processor 204 may select a façade for presenting the bingo game outcome that satisfies the bonus game condition and the enhancement condition and, based on the selected façade, the processor 204 causes display of one or more spin and stop sequences and the associated outcome(s) of the base reel game 400 and one or more free spins and the associated outcome(s) of the bonus reel game 500 having one or more enhanced characteristics. If no free spin outcomes for the bonus game 500, with or without an enhanced characteristic, exist for the winning patterns, the processor 204 may present the winning patterns as one or more outcomes of the base game 400 (e.g., for a given bingo game outcome, only façades that contain one or more outcomes of the base game 400 may be identified and selected from).

In some implementations, façades may be stored that contain a sequence of spins and outcomes of the base game 400 and the bonus reel game 500 (with or without enhanced characteristic(s)) for presenting each of the winning patterns. That is, façades may exist that contain a sequence of spins and outcomes including an outcome of the base reel game 400, one or more free spin outcomes of the bonus reel game 500 without an enhanced characteristic, and/or one or more free spin outcomes of the bonus reel game 500 having one or more enhanced characteristics for presenting all the winning patterns. In these implementations, the processor 204 may select a single façade to present the bingo game outcome. To illustrate, returning to the example where the bingo game outcome includes multiple winning patterns associated with a 10 credit, a 100 credit, and a 1000 credit pattern win, the processor 204 may query the table or database to identify façades for presenting each of the winning patterns and/or the award value(s) as one or more spin and stop sequences and the associated outcome(s) of the base reel game 400 and one or more free spins and the associated outcome(s) of the bonus reel game 500 having one or more enhanced characteristics. For example, one or more façades may exist that contain a spin and stop sequence and associated outcome of the base reel game 400 for presenting the 10 credit pattern win and one or more free spins and the associated outcome(s) of the bonus reel game 500 having an award multiplier characteristic, a jackpot characteristic, an expanding reels characteristic, or any combination thereof, for presenting the 100 credit pattern win and the 1000 credit pattern win. Additionally and/or alternatively, one or more façades may exist that contain a spin and stop sequence and associated outcome of the base reel game 400 for presenting the 10 credit pattern win, one or more free spins and the associated outcome(s) of the bonus reel game 500 without an enhanced characteristic for presenting the 100 credit pattern win, and one or more free spins and the associated outcome(s) of the bonus reel game 500 having one or more enhanced characteristics for presenting the 1000 credit pattern win. Additionally and/or alternatively, one or more façades may exist that contain one or more spin and stop sequences and associated outcome(s) of the base reel game 400 for presenting the 10 credit pattern win and the 100 credit win, and one or more free spins and the associated outcome(s) of the bonus reel game 500 having one or more enhanced characteristics for presenting the 1000 credit pattern win. The processor 204 then selects (e.g., randomly selects based upon a random number provided by the RNG 212) one of the identified façades for the bingo game outcome and, in response and based on the selected façade, the processor 204 causes display of the sequence of spins and outcomes including an outcome of the base reel game 400, one or more free spin outcomes of the bonus reel game 500 without an enhanced characteristic, and/or one or more free spin outcomes of the bonus reel game 500 having one or more enhanced characteristics for presenting the 10 credit pattern win, the 100 credit pattern win, and the 1000 credit pattern win.

In some implementations, façades may be stored that contain one or more spins and outcomes of the base game 400 and/or the bonus reel game 500 (with or without enhanced characteristic(s)) for presenting a single winning pattern of a bingo game outcome. In these implementations, the processor 204 may separately select a façade for each winning pattern of the bingo game outcome to be presented. The processor 204 may identify the façades containing free spin(s) and associated outcome(s) for a bonus game 500 having an enhanced characteristic (or combination of enhanced characteristics) that is common between the winning patterns of the bingo game outcome. For each winning pattern, the processor 204 may randomly select, from the identified façades, a façade that contains free spin(s) and associated outcome(s) of the bonus reel game 500 having the common enhanced characteristic(s). The processor 204 may then initiate the bonus game 500 having the enhanced characteristic(s) commonly triggered by the winning patterns of the bingo game outcome and cause display of the randomly selected façade(s). If no façades that contain free spin outcome(s) for the bonus game 500 having common enhanced characteristic(s) exist in the table or database for the winning patterns of the bingo game outcome, the processor 204 may initiate the bonus game 500 without an enhanced characteristic (shown in FIG. 5). Alternatively, the processor 204 may present one of the winning patterns of the bingo game outcome (e.g., a winning pattern associated with a smaller award value) as an outcome of the base game 400 and/or an outcome of the bonus game 500 without an enhanced characteristic, and present another one of the winning patterns (e.g., a winning pattern associated with a larger award value) as a free spin outcome of a bonus game 500 having one or more enhanced characteristics.

To illustrate, returning to the example where the bingo game outcome includes multiple winning patterns associated with a 10 credit, a 100 credit, and a 1000 credit pattern win, the processor 204 may query the table or database to separately identify façades for presenting each of the 10 credit pattern win, the 100 credit pattern win, and the 1000 credit pattern win. That is, the processor 204 separately identifies one or more façades for presenting each of the 10 credit pattern win, one or more façades for presenting the 100 credit pattern win, and one or more façades for presenting the 1000 credit pattern. In some examples, the façades identified for the 10 credit pattern win may only contain spins and associated outcomes for the base reel game 400, and façades may be identified for the 100 credit pattern win that contain free spins and associated outcomes for the bonus reel game 500 having one or more enhanced characteristics and façades may be identified for the 1000 credit pattern win that contain free spins and associated outcomes for the bonus reel game 500 having one or more enhanced characteristics. The processor 204 may initially and separately identify subsets of the façades for presenting the 100 credit pattern win and subsets of the façades for presenting the 1000 credit pattern win that contain free spins and associated outcomes for the bonus reel game 500 having common enhanced characteristic(s). For example, if façades are identified for the 100 credit pattern win and the 1000 credit pattern win that contain free spins and associated outcomes for the bonus reel game 500 having a jackpot characteristic, the processor 204 would identify these façades for each of the 100 credit pattern win and the 1000 credit pattern win as a subset. The processor 204 then may randomly select a subset of the façades for each of the 100 credit pattern win and the 1000 credit pattern win and, from the randomly selected subset, randomly select a façade for each of the 100 credit pattern win and the 1000 credit pattern win. In some instances, the identified façades for the 100 credit pattern win and the 1000 credit pattern win may not contain free spins and associated outcomes for a bonus reel game 500 having a common enhanced characteristic(s). The processor 204 may select façades for each of the 100 credit pattern win and the 1000 credit pattern win that contain free spins and associated outcomes for a bonus reel game 500 without an enhanced characteristic, and/or the processor 204 may select a façade for the 100 credit pattern win that contains one or more spins and associated outcome(s) of the base game 400 and/or the bonus game 500 without an enhanced characteristic, and select a façade for the 1000 credit pattern win that contains one or more free spins and associated outcome(s) of a bonus game 500 having one or more enhanced characteristics. Thus, based on the selected façades, the 10 credit pattern win and the 100 credit pattern win may be presented as spins and associated outcomes of the base reel game 400 and/or the bonus game 500 without an enhanced characteristic, and the 1000 credit pattern win may be presented as one or more free spins and associated outcome(s) of the bonus game 500 having one or more enhanced characteristics. This game design advantageously provides flexibility and variability in presenting the largest pattern win(s) under a distinct façade (e.g., as a bonus game 500 having enhanced characteristics not applied when presenting other winning patterns).

Thus, the enhanced characteristics of the free spin bonus game 500 may be implemented in Class II and Class III games, and whether an enhancement condition is satisfied may be determined by various means. The methods described herein for determining whether the enhancement condition is satisfied are merely illustrative, and other suitable approaches are contemplated and within the scope of the present disclosure.

In the example implementation, in both Class II and Class III games, in response to the bonus game condition and enhancement condition being satisfied, the bonus game 500 having one or more enhanced characteristics is triggered after an outcome of the base reel game 400 is displayed. When the bonus game 500 having one or more enhanced characteristics is triggered, one or more enhancement symbols may be displayed in the first reel matrix 416 in an outcome of the base reel game 400. Each enhancement symbol is associated with one of the enhanced characteristics of the bonus game 500. In Class II games, an enhancement symbol being displayed in the first reel matrix in an outcome of the base reel game 400 is merely representative of an enhancement condition being satisfied. That is, the processor 204 may determine that an enhancement condition is satisfied for an enhanced characteristic (or combination of enhanced characteristics) of the bonus game 500 based on an outcome of the Class II (e.g., bingo) game, and, in response, controls one or more of the first plurality of reels 402-410 to display the associated enhancement symbol (or combination of enhancement symbols) in the first reel matrix 416 in an outcome of the base reel game 400. The bonus game 500 including the enhanced characteristic (or combination of enhanced characteristics) is subsequently initiated, and a player thereby perceives that the display of the enhancement symbol (or combination of enhancement symbols) triggers the enhanced characteristic (or combination of enhanced characteristics) of the bonus game 500.

In Class III games, an enhancement symbol being displayed in the first reel matrix 416 in an outcome the base reel game 400 may itself satisfy an enhancement condition of the enhanced characteristic associated with the enhancement symbol that is displayed. In some implementations, the display of the enhancement symbol may be necessary but not sufficient to trigger a bonus game 500 having the associated enhanced characteristic. Specifically, the display of the enhancement symbol may not satisfy the bonus game condition. As such, in some implementations, there may be instances where, in an outcome of the base reel game 400, an enhancement symbol is displayed in the first reel matrix 416 and a bonus game 500 is not triggered. Similarly, in Class II games, as described in further detail below, there may be instances where an enhancement symbol is displayed but the bonus game 500 is not triggered.

In addition to the enhancement symbols, a plurality of metamorphics 418, 420, and 422 may be displayed on a display of an EGM 104A-104X or 200, such as, for example, on the secondary display 414, whereby the plurality of metamorphics 418-422 may appear above and/or adjacent to the first reel matrix 416. Each metamorphic 418-422 is associated with an enhanced characteristic of the bonus game 500, and is activated when a bonus game 500 having the associated enhanced characteristic is triggered. It will be appreciated that the metamorphics 418-422 may appear in any other suitable location as well as on any display of an EGM 104A-104X or 200. For example, in at least some implementations, the metamorphics 418-422 appear on the primary display 412. In other implementations, the metamorphics 418-422 may appear on a display of button deck 120.

In the example implementation, the base reel game 400 includes display of three metamorphics 418-422. These include a multiplier metamorphic 418 (associated with the award multiplier characteristic), a jackpot metamorphic 420 (associated with the jackpot characteristic), and an expanding reels metamorphic 422 (associated with the expanding reels characteristic). Although three metamorphics 418-422 are shown and described, it will be appreciated that any suitable number of metamorphics may be included in base reel game 400. For example, the number of metamorphics may vary to match a number of potential enhanced characteristics of the bonus game 500.

The metamorphics 418-422 may be used in conjunction with the enhancement symbols that are displayed in the first reel matrix 416 to provide a visual representation to a player that an enhancement symbol being displayed in the first reel matrix 416 after base reel game 400 triggers the associated enhanced characteristic of the bonus game 500. In particular, each enhancement symbol is associated with one of the metamorphics 418-422, the association being establish by a common enhanced characteristic associated with the enhancement symbol and the metamorphic. During the base reel game 400, the metamorphics 418-422 may each be in an inactive state. For example, in the example implementation, each metamorphic 418-422 is a safe and, in the inactive state, the safe is closed. In response to an enhancement symbol being displayed in the reel matrix 416 in an outcome of the base reel game 400, the associated metamorphic 418-422 is transformed to either an intermediate state (e.g., in which the safe moves and/or grows in size) or an active state (e.g., in which the safe opens). Whether the associated metamorphic 418-422 transforms to the intermediate state or the active state may be determined based on whether the bonus game 500 is triggered in conjunction with the display of the enhancement symbol (i.e., whether a primary game outcome presented by the outcome of the base game 400 also triggers the bonus game 500). If the bonus game 500 is not triggered, the metamorphic 418-422 associated with an enhancement symbol in the first reel matrix 416 transforms to the intermediate state. By transforming the metamorphic 418-422 to the intermediate state (e.g., moves and/or grows in size), the player may perceive that the opportunity for a bonus game 500 having the enhanced characteristic associated with the transformed metamorphic 418-422 has increased. If the bonus game 500 is triggered, the metamorphic 418-422 associated with an enhancement symbol in the first reel matrix 416 transforms to the active state (e.g., the safe opens). By transforming the metamorphic 418-422 to the active state, the player is informed that a bonus game 500 having the enhanced characteristic associated with the transformed metamorphic 418-422 has been triggered and perceives, via the visual representation, that the enhancement symbol being displayed in the first reel matrix 416 triggers the associated enhanced characteristic of the bonus game 500. If multiple enhancement symbols are displayed in the first reel matrix 416, each associated metamorphic 418-422 is transformed to either the intermediate state or the active state, depending on whether the bonus game 500 is triggered. Further, a visual representation that the transformation of the metamorphic 418-422 is caused by the associated enhancement symbol being displayed in the first reel matrix 416 may be provided, such as by moving the enhancement symbol up toward the associated metamorphic 418-422 before and/or during the metamorphic 418-422 being transformed.

Figure 6:
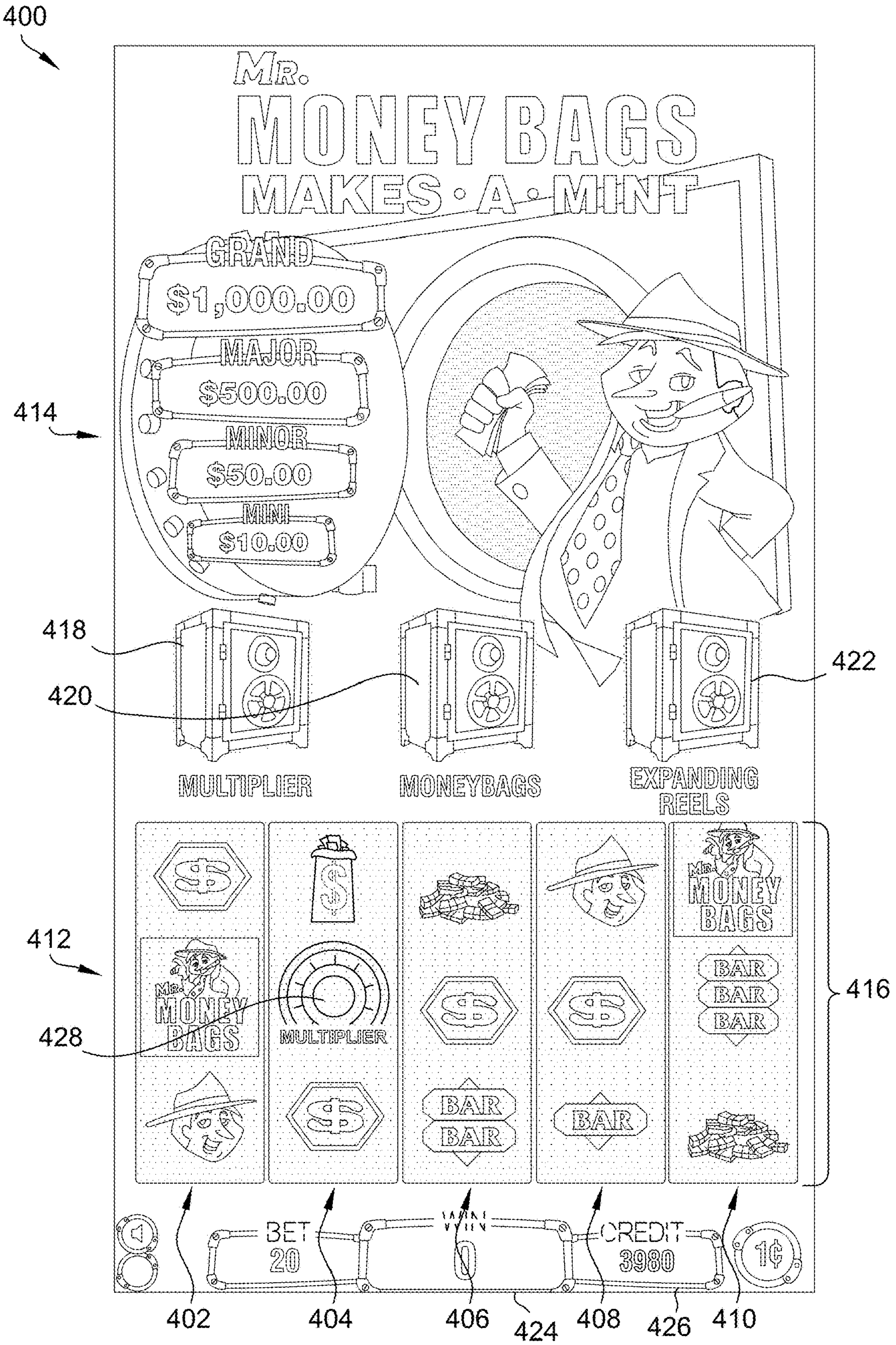
FIGS. 6 and 7 each illustrate an example user interface or screenshot of the base reel game shown in FIG. 4 where an award multiplier enhancement symbol is displayed in a reel matrix of the base reel game.
Figure 7:
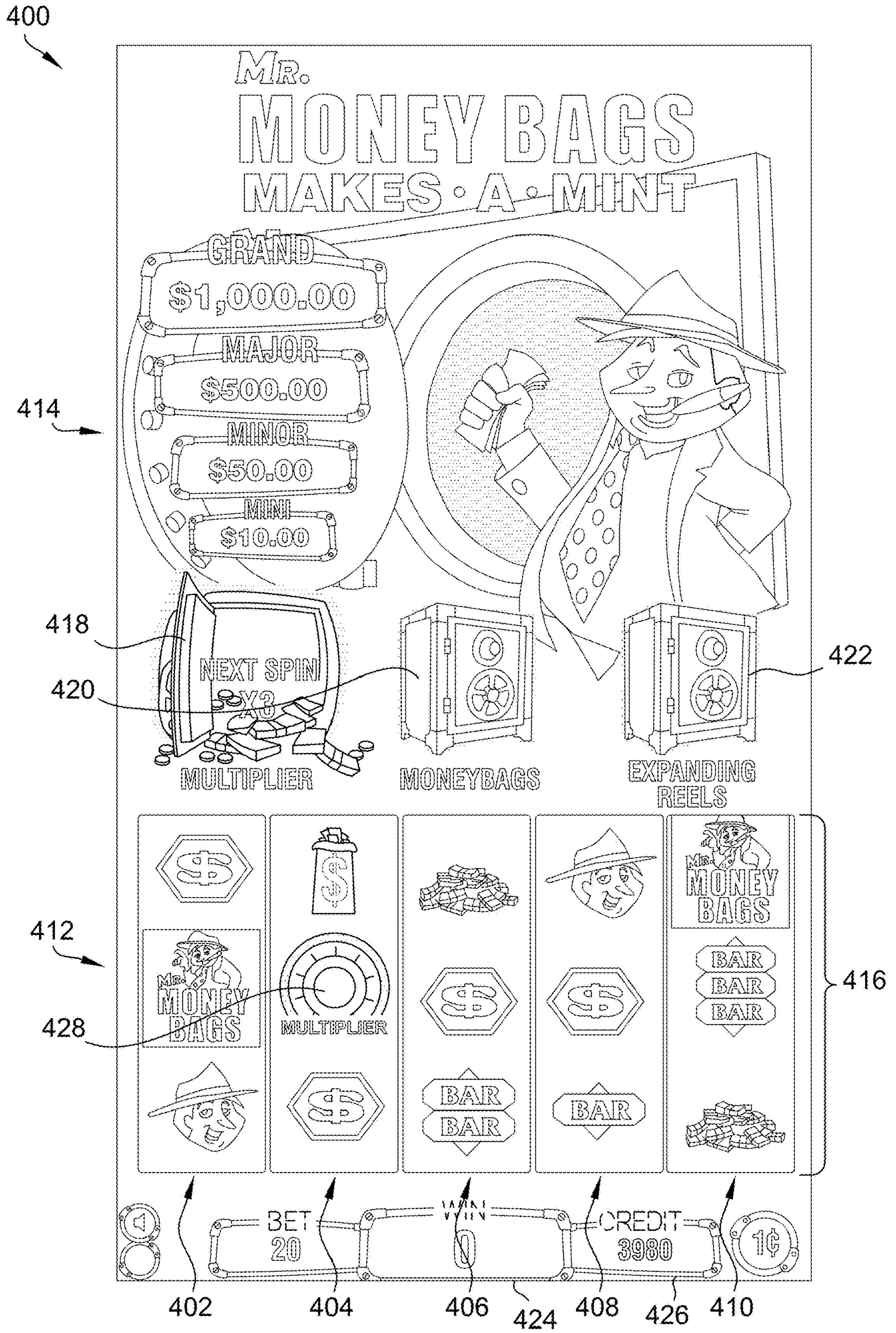
Figure 8:
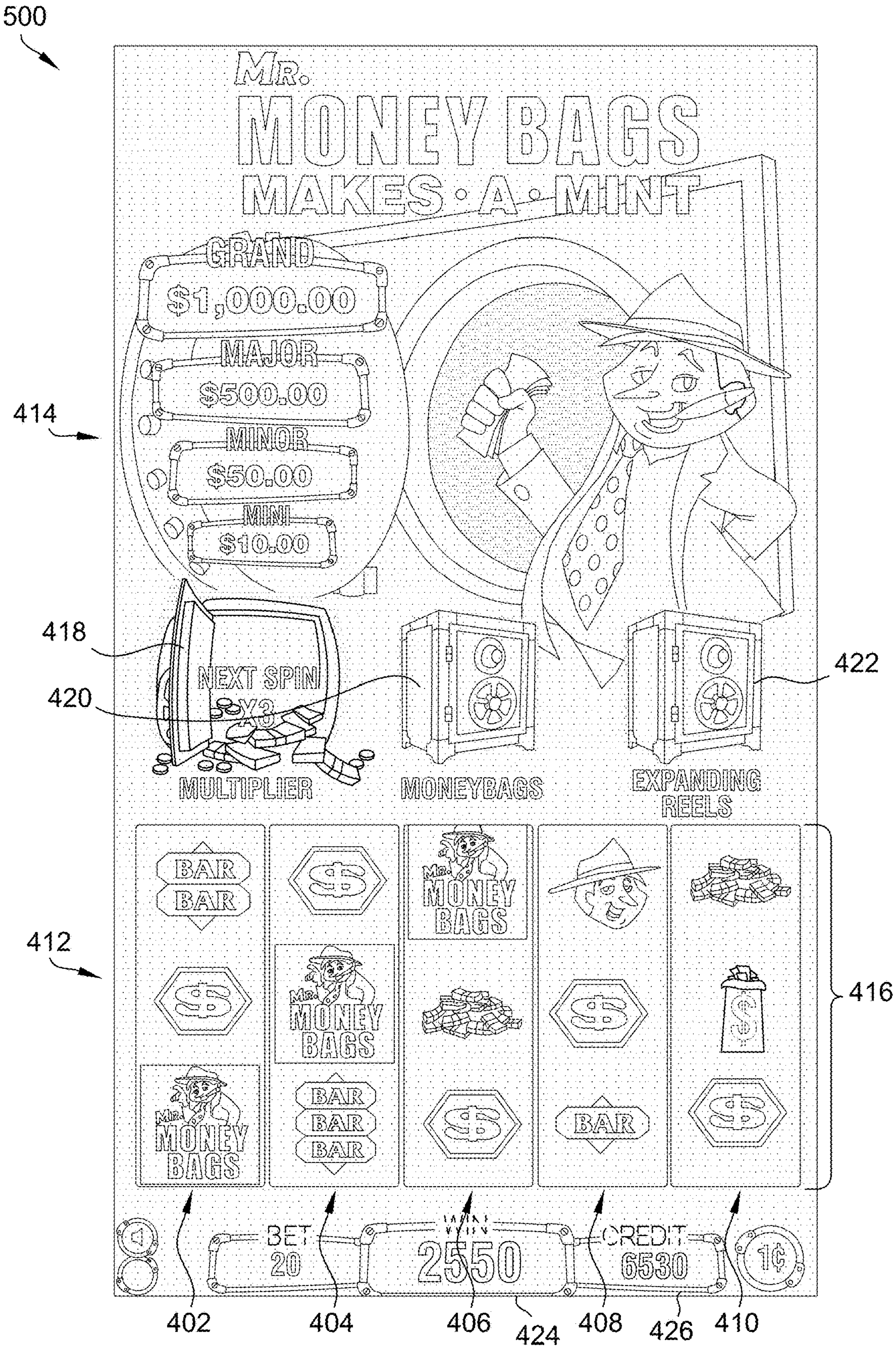
FIG. 8 illustrates an example user interface or screenshot of another implementation of the bonus reel game shown in FIG. 5 and initiated after the base reel game shown in FIGS. 6 and 7, the bonus reel game having an award multiplier characteristic.

With reference now to FIGS. 6-8, user interfaces or screen shots of a sequence between the base reel game 400 (FIGS. 6 and 7) and the bonus game 500 (FIG. 8) having an award multiplier characteristic are shown. As shown in FIG. 6, in an outcome of the base reel game 400, a multiplier enhancement symbol 428 associated with the award multiplier characteristic is displayed in the first reel matrix 416. The multiplier enhancement symbol 428 in the example implementation is only shown on reel 404, although in other examples the multiplier enhancement symbol 428 may be shown on any of the first plurality of reels 402-410. As shown in FIG. 7, the multiplier metamorphic 418 is transformed to the active state (e.g., the Multiplier Safe opens) in response to the multiplier enhancement symbol 428 being displayed in the first reel matrix 416 in the outcome of the base reel game 400. In the example implementation, the multiplier metamorphic 418 transforms to the active state from an inactive state (e.g., the Multiplier Safe is closed), visually representing that the bonus game 500 having the award multiplier characteristic is triggered. In other examples, if the bonus game 500 is not triggered, the multiplier metamorphic 418 may transform to an intermediate state (e.g., the Multiplier Safe may move and/or grow in size) in response to the multiplier enhancement symbol 428 being displayed in the first reel matrix 416 in an outcome of the base reel game 400.

As shown in FIG. 8, after the multiplier enhancement symbol 428 is displayed in the first reel matrix 416 in the outcome of the base reel game 400 (FIG. 6) and the multiplier metamorphic 418 transforms to the active state (FIG. 7), the bonus game 500 having the award multiplier characteristic is initiated. As described above, the bonus game 500 includes one or more free spins, and each spin results in a winning outcome having an associated award value. In the example shown, the bonus game 500 having the award multiplier characteristic includes one or more free spins (i.e., spin and stop sequences) of the first plurality of reels 402-410 in the first reel matrix 416, and the award multiplier characteristic of the bonus game 500 causes the award value of each free spin reel outcome to increase by an award multiplier.

The award multiplier of the bonus game 500 having this enhanced characteristic may be determined so that the resulting increase in the award value caused by the multiplier matches an award value of a winning bingo game outcome (i.e., in Class II games) or the award multiplier may be randomly determined (i.e., in Class III games). To provide more control over the increase in the award value of the reel outcome caused by the award multiplier, in this example, a plurality of reels that include different symbol combinations and reel outcome award values from the first plurality of reels 402-410 may be utilized. Various award multipliers may be applied, such as a 2× multiplier, a 3× multiplier, a 5× multiplier, and an 8× multiplier. If the bonus game 500 having the award multiplier characteristic includes multiple free spins, a different award multiplier may be applied for each free spin. For example, the processor 204 may control the free spins during the bonus game 500 having the award multiplier characteristic such that the award multiplier may increase for each successive free spin. Increasing the award multiplier as the free spins continue during the bonus reel game 500 may facilitate increasing player excitement during the bonus game 500. As shown in FIGS. 7 and 8, the multiplier metamorphic 418 may display the award multiplier that is applied for each free spin. In the example shown, a 3× multiplier is applied and shown in the multiplier metamorphic 418. As the free spins continue and the award multiplier may change (e.g., from 3× to 5×), the multiplier metamorphic 418 changes to inform the player of the award multiplier being applied for each free spin.

Figure 9:
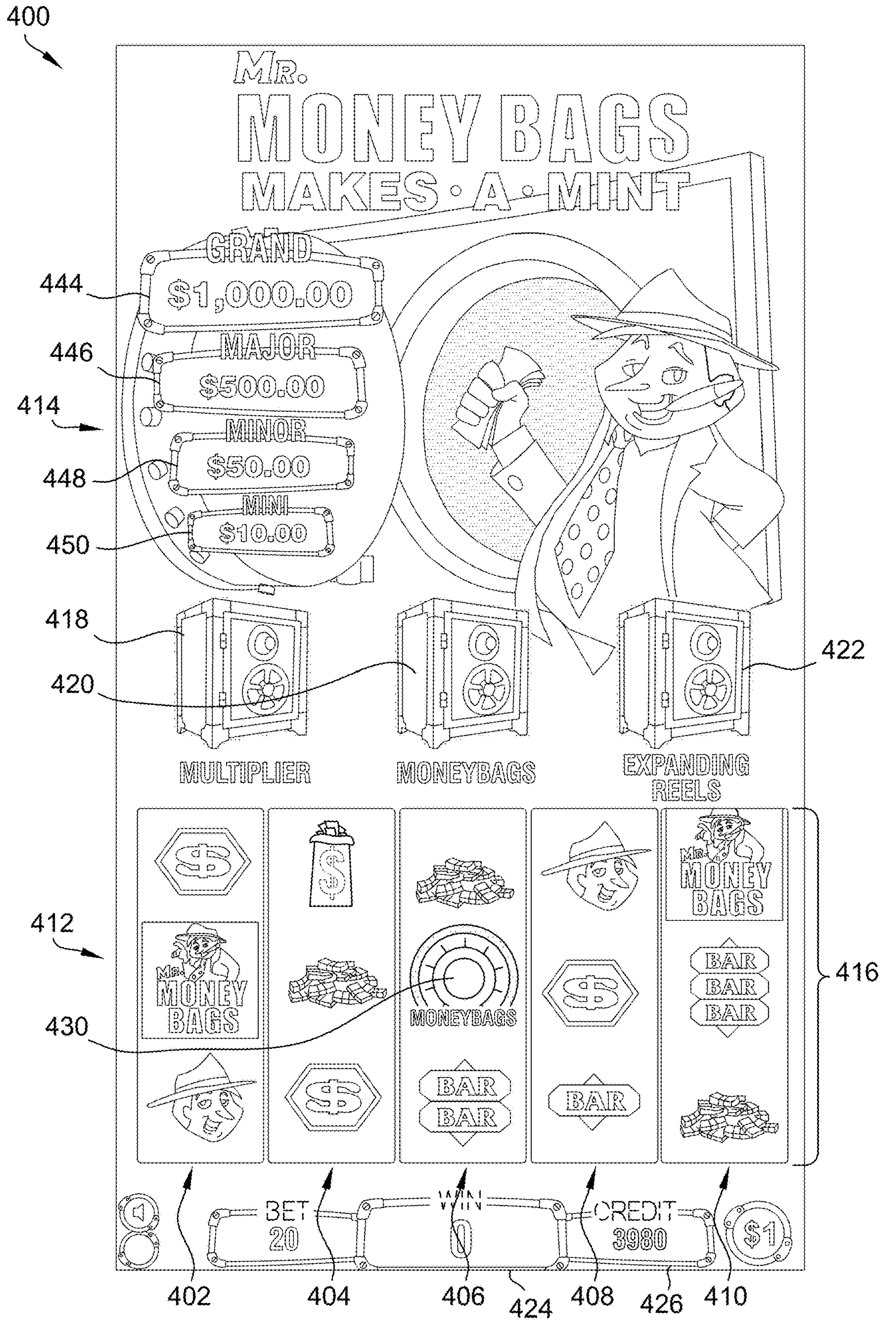
FIG. 9 illustrates an example user interface or screenshot of the base reel game shown in FIG. 4 wherein a jackpot enhancement symbol is displayed in a reel matrix of the base reel game FIGS. 10-12 each illustrate an example user interface or screenshot of another implementation of the bonus reel game shown in FIG. 5 and initiated after the base reel game shown in FIG. 9, the bonus reel game having a jackpot characteristic.
Figure 10:
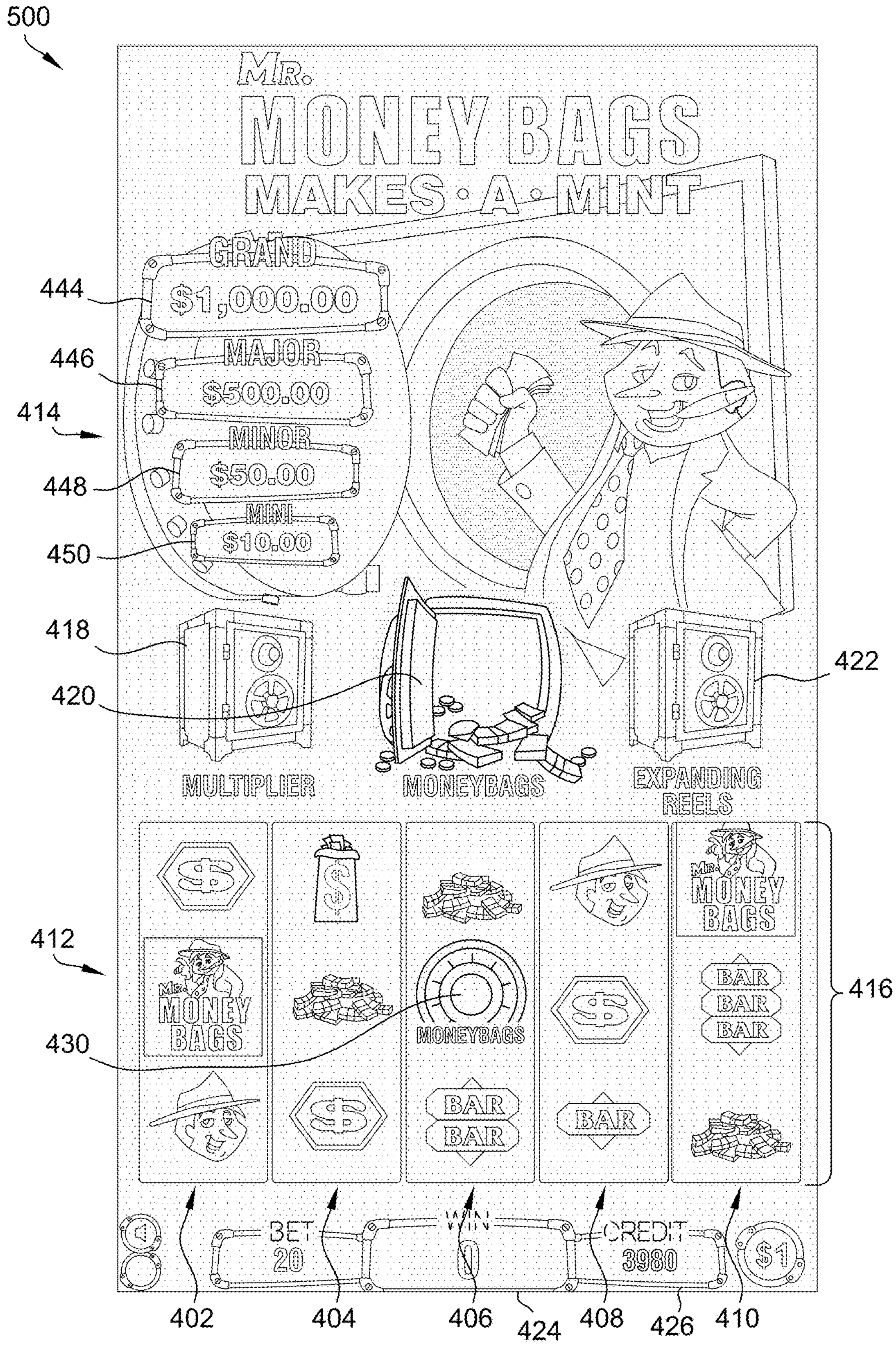

With reference now to FIGS. 9-12, user interfaces or screen shots of a sequence between the base reel game 400 (FIG. 9) and the bonus game 500 (FIGS. 10-12) having a jackpot characteristic are shown. As shown in FIG. 9, in an outcome of the base reel game 400, a jackpot enhancement symbol 430 (shown as a Money Bags enhancement symbol) associated with the jackpot characteristic is displayed in the first reel matrix 416. The jackpot enhancement symbol 430 in the example implementation is only shown on reel 406, although in other examples the jackpot enhancement symbol 430 may be shown on any of the first plurality of reels 402-410. As shown in FIG. 10, the jackpot metamorphic 420 (shown as a Money Bags Safe) is transformed to the active state (e.g., the Money Bags Safe opens) in response to the jackpot enhancement symbol 430 being displayed in the first reel matrix 416 in the outcome of the base reel game 400. In the example implementation, the jackpot metamorphic 420 transforms to the active state from an inactive state (e.g., the Money Bags Safe is closed), visually representing that the bonus game 500 having the jackpot characteristic is triggered. In other examples, if the bonus game 500 is not triggered, the jackpot metamorphic 420 may transform to an intermediate state (e.g., the Money Bags Safe may move and/or grow in size) in response to the jackpot enhancement symbol 430 being displayed in the first reel matrix 416 in the outcome of the base reel game 400.

During the bonus game 500 having the jackpot characteristic, a second plurality of reels 432-440 is utilized in place of the first plurality of reels 402-410. That is, each free spin of the bonus game 500 having the jackpot characteristic includes a spin and stop sequence of the second plurality of reels 432-440 in the first reel matrix 416. The second plurality of reels 432-440 include a different set of reel strips from the first plurality of reels 402-410. The reel strips for the first plurality of reels 402-410 and the second plurality of reels 432-440 may be stored in a computer memory of any of EGMs 104A-104X or 200, such as memory 208, and the processor 204 determines that the second plurality of reels 432-440 and the associated reel strips should be included in the bonus game 500 in response to determining an associated enhancement condition is satisfied.

Figure 11:
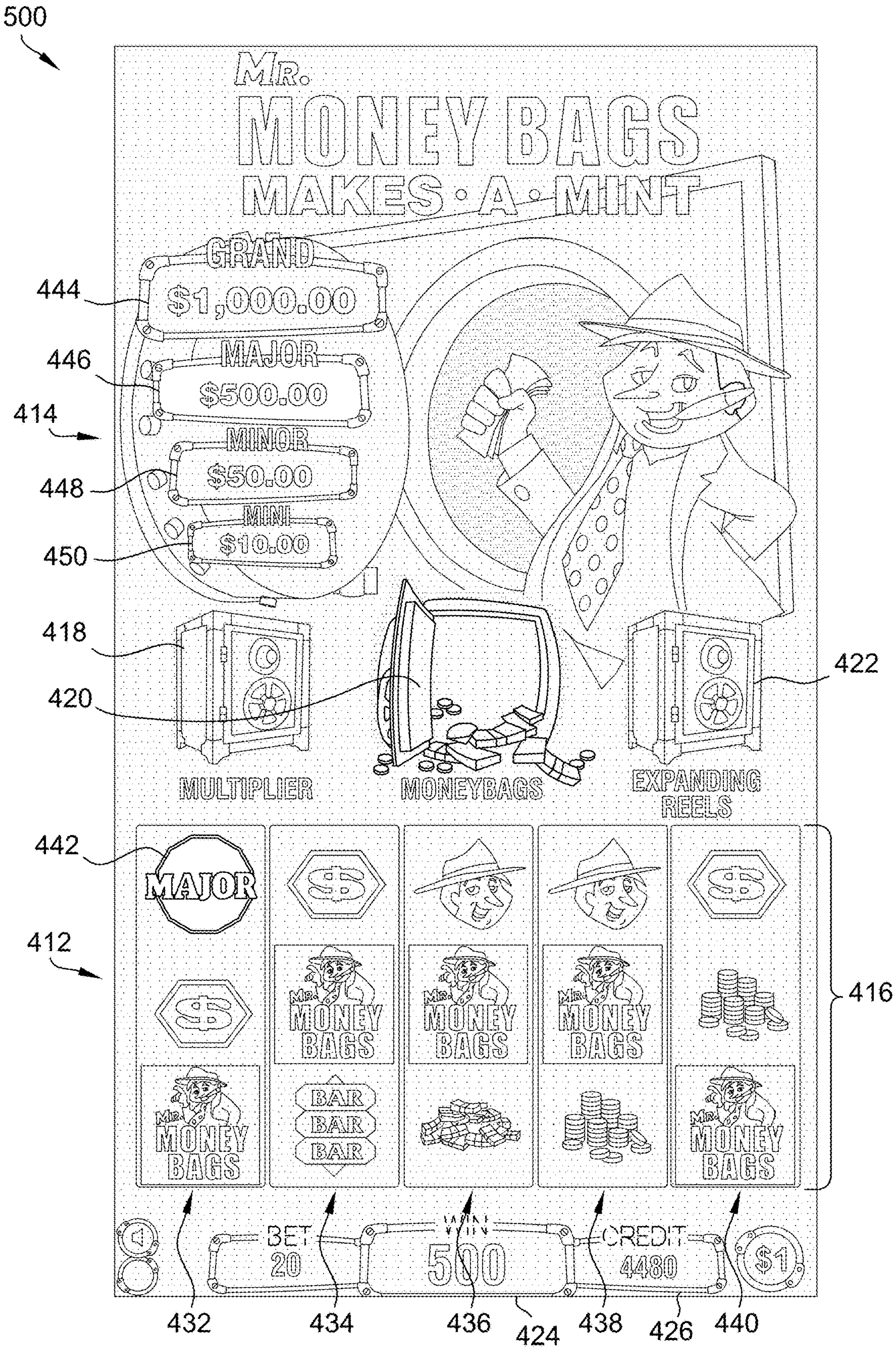

The second plurality of reels 432-440 include credit symbols that, when displayed in an outcome of the bonus game 500, are associated with an award value. For example, as shown in FIG. 11, the credit symbols of the second plurality of reels 432-440 include jackpot award symbols ranging from "mini", "minor", "major", and "grand". In the example shown in FIG. 11, a major jackpot award symbol 442 is displayed in the first reel matrix 416 in an outcome of a free spin of the bonus game 500 having the jackpot characteristic. An award value associated with the jackpot award symbols may be presented to the player (e.g., on the secondary display 414) during the base reel game 400 and the bonus game 500. Specifically, the secondary display 414 includes a grand jackpot value 444, a major jackpot value 446, a minor jackpot value 448, and a mini jackpot value 450 that inform the play of a credit awarded when the respective jackpot award symbol is displayed in the first reel matrix 416. In the example shown in FIG. 11, an award value for the major jackpot symbol 442 being displayed matches the major jackpot value 446 displayed on the secondary display 414 (i.e., 500 credits).

Figure 12:
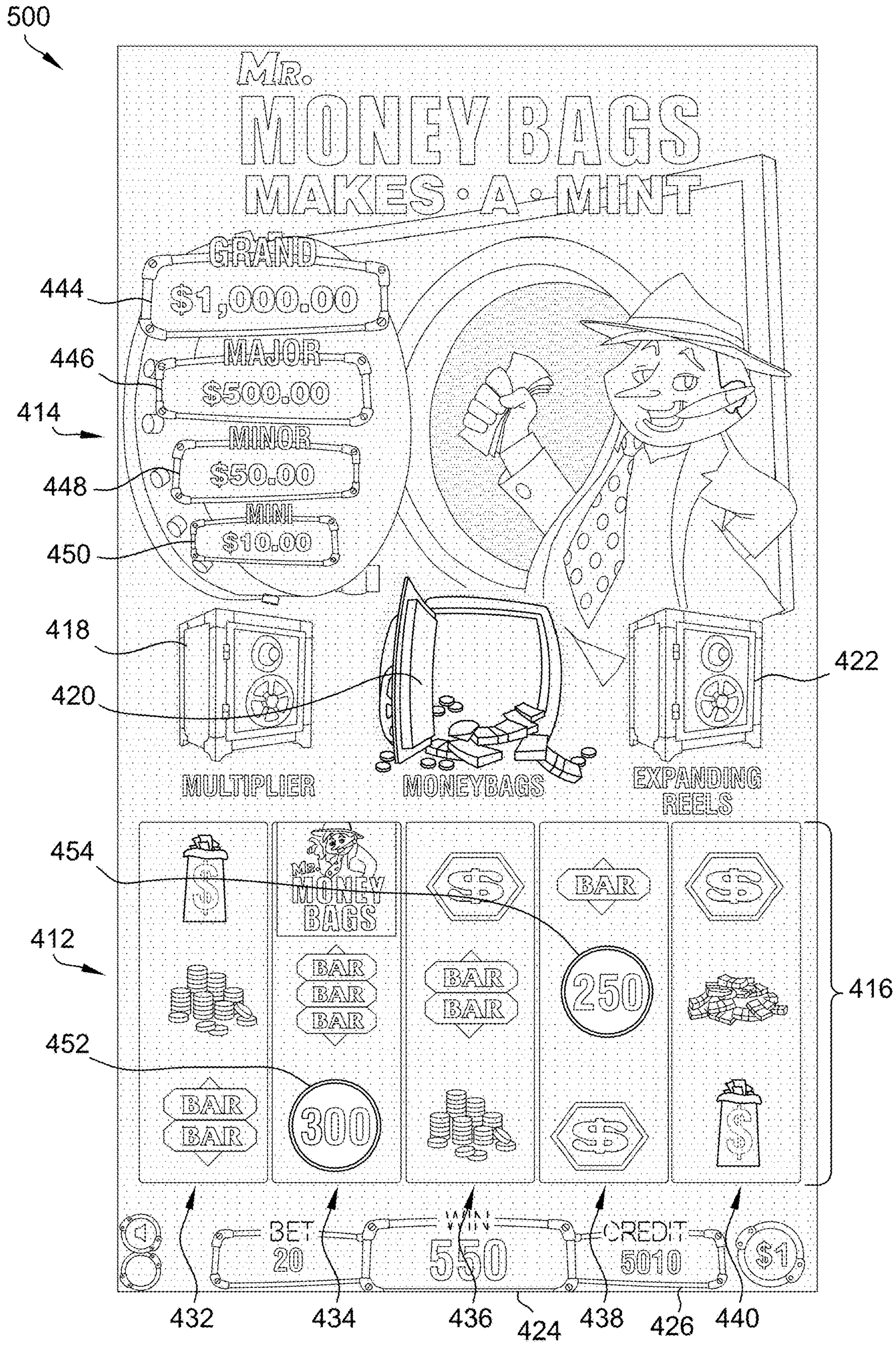

As shown in FIG. 12, the credit symbols of the second plurality of reels 432-440 also include "cash-on-reel" symbols that indicate an award value associated with the symbol being displayed in an outcome of the bonus game 500. In the example shown in FIG. 12, a cash-on-reel symbol 452 having a 300 credit value and a cash-on-reel symbol 454 having a 250 credit value are displayed in the first reel matrix 416 in an outcome of a free spin of the bonus game 500. Accordingly, the win meter 424 displays a total credit award value of 550 after the free spin.

In some implementations, the bonus game 500 having the jackpot characteristic may include a re-trigger or re-spin feature that triggers (e.g., in Class III games) at least one additional free spin of the bonus game 500 or visually represents that an additional free spin has been triggered (e.g., in Class II games). In example implementations, an additional free spin is triggered or is visually represented as being triggered by a preselected or predefined number of cash-on-reel symbols 452 being displayed in the first reel matrix 416 in an outcome of the bonus game 500. Additionally and/or alternatively, an additional free spin may be triggered or visually represented as being triggered by a preselected or predefined number of cash-on-reel symbols 452 being displayed in an outcome of the base game 400. In example implementations, the additional free spin may be triggered or visually represented as being triggered by three or more cash-on-reel symbols 452 being displayed in a reel game outcome. The three or more cash-on-reel symbols 452 may be displayed in conjunction with a special symbol (e.g., a +1 symbol) in the reel game outcome. For example, the special symbol (e.g., a +1 symbol) may be displayed by the reel 410 in the reel matrix in an outcome of the base game 400 and/or the bonus game 500. In response to the three or more cash-on-reel symbols 452 being displayed, a total award value associated with the cash-on-symbols together with any additional award value (e.g., from display of any winning symbol combinations) accrued in the game outcome may be displayed, for example, in the win meter 424, and the at least one additional free spin is subsequently displayed. Additional free spins may continue to be triggered or are visually represented as being triggered by the preselected or predefined number of cash-on-reel symbols 452 and/or a special symbol (e.g., a +1 symbol) being displayed in an outcome of a preceding free spin.

The at least one additional free spin feature of the bonus game 500 having the jackpot characteristic and/or the base game 400 may additionally and/or alternatively apply the total award value of the displayed cash-on-reel symbols 452 as a minimum win guaranteed during a triggered additional free spin. As an illustrative example, a game outcome (e.g., of the bonus game 500 or the base game 400) may include display of three cash-on-reel symbols 452 that have a total award value of 500 credits. The three cash-on-reel symbols 452 being displayed trigger an additional free spin or visually represent an additional free spin being triggered. During the triggered additional free spin, the total award value of 500 credits may be displayed as a "minimum win" for the additional free spin. That is, the player is guaranteed to at least accrue the total award value of 500 credits after the additional free spin, even if no additional awards (e.g., by display of winning symbols combinations and/or cash-on-reel symbols) occur in an outcome of the additional free spin. After the additional free spin, a total award value that is the sum of the minimum win together with any additional award value (e.g., from display of any additional winning symbol combinations and/or cash-on-reel being displayed) accrued in the additional free spin outcome may be displayed, for example, in the win meter 424. The additional free spin and minimum win sequence may continue if a preceding additional free spin outcome includes display of the preselected or predefined number of cash-on-reel symbols 452 and/or display of a special symbol (e.g., a +1 symbol).

The guaranteed minimum win feature of the at least one additional free spin may be implemented by various means. In some example implementations, a separate weight table may be used to control the outcome of the additional free spin to assure that one or more cash-on-reel symbols are displayed and that the total award value associated with the one or more cash-on-reel symbols that are displayed meets or exceeds the minimum win value. Additionally and/or alternatively, a number of free spins may be triggered and the display sequence of the free spins is controlled such that the award value associated with each free spin outcome increases from a preceding free spin. Additionally and/or alternatively, an award value associated with an outcome of the base game 400 or the bonus game 500 may be partitioned into or distributed across outcomes of multiple additional free spins. It will, however, be appreciated that these means are described by way of example only and that other methods for implementing the guaranteed minimum win feature may be implemented as well.

Figure 13:
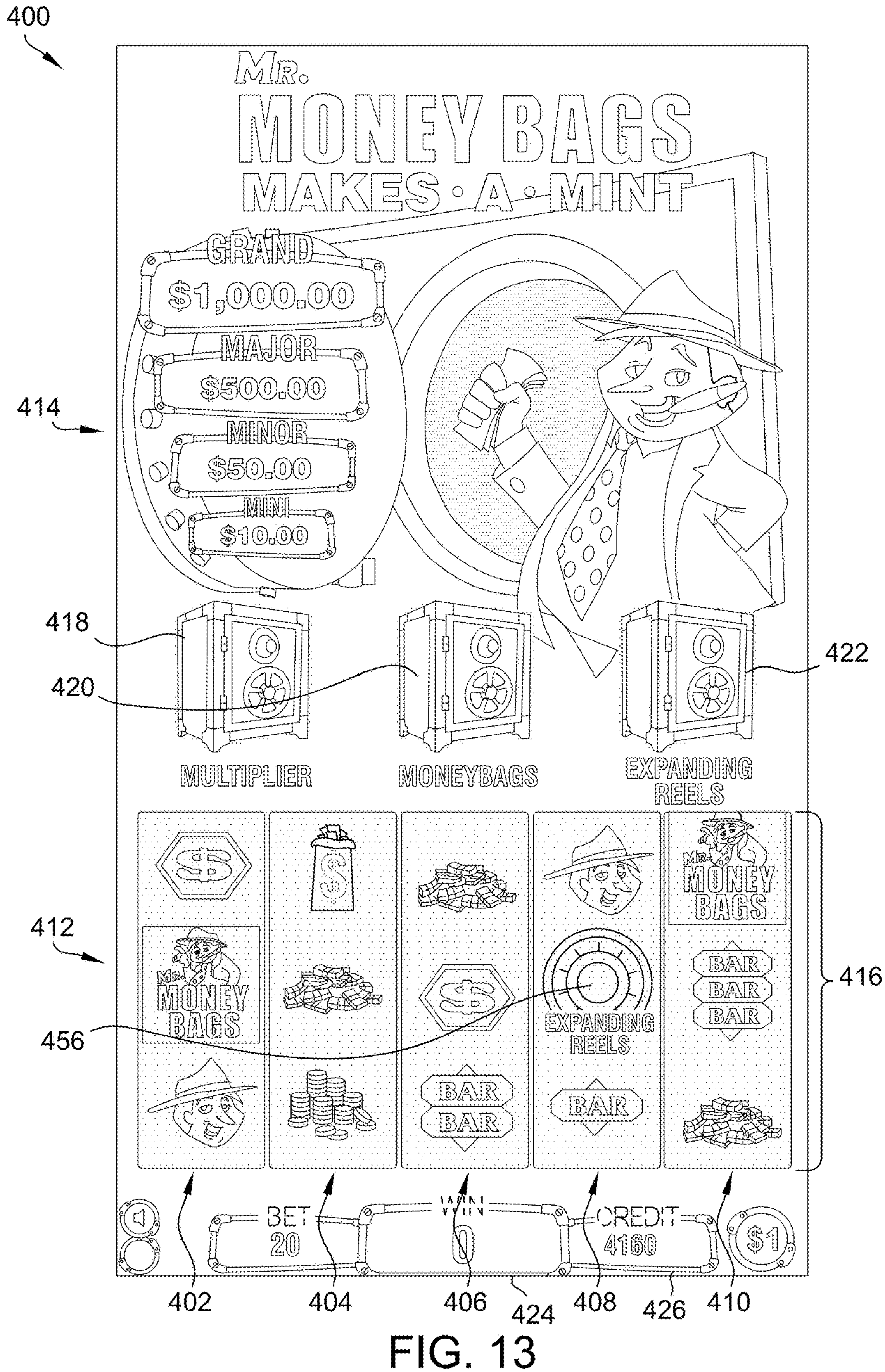
FIG. 13 illustrates an example user interface or screenshot of the base reel game shown in FIG. 4 wherein an expanding reels enhancement symbol is displayed in a reel matrix of the base reel game FIGS. 14 and 15 each illustrate an example user interface or screenshot of another implementation of the bonus reel game shown in FIG. 5 and initiated after the base reel game shown in FIG. 13, the bonus reel game having an expanding reels characteristic.
Figure 14:
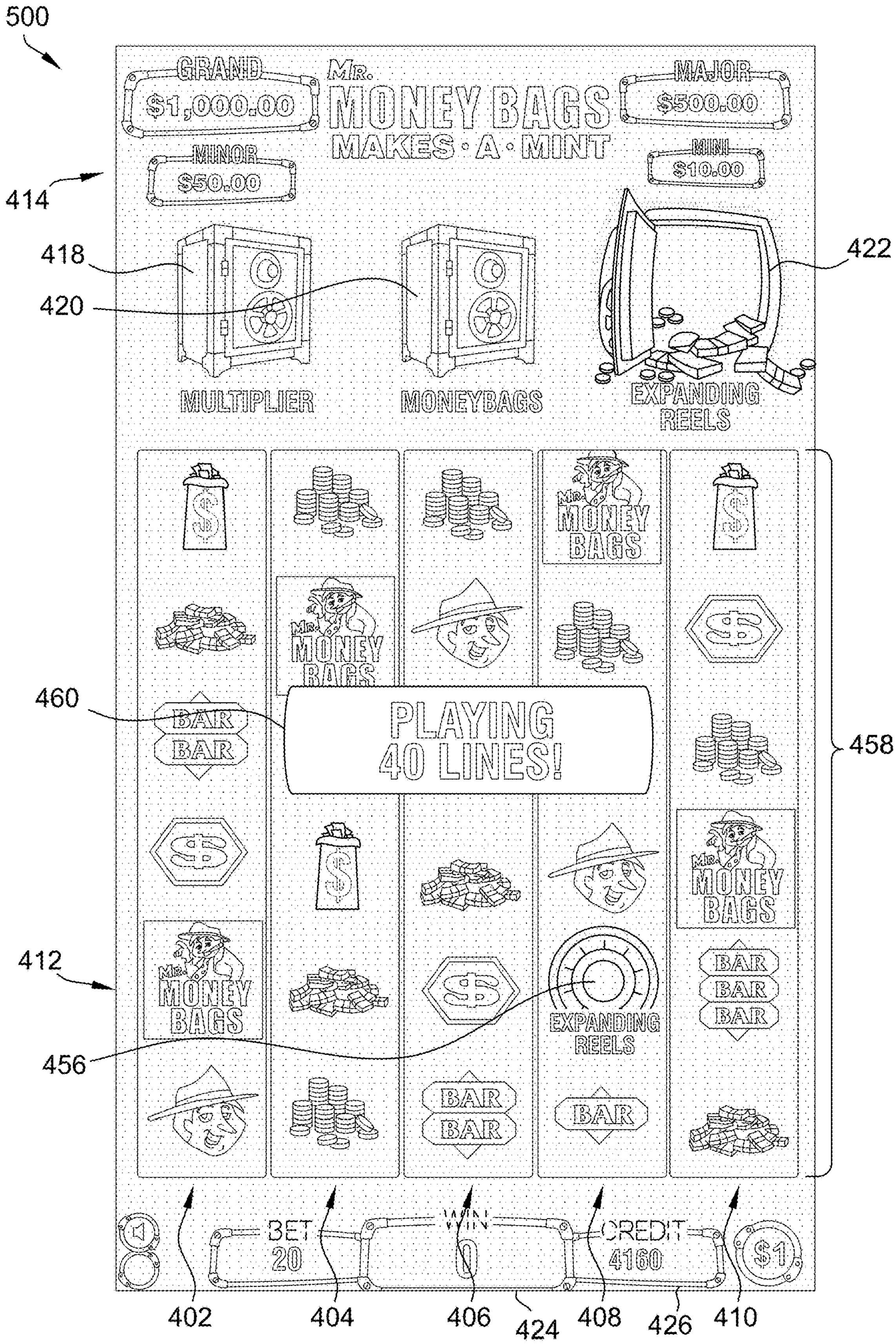
Figure 15:
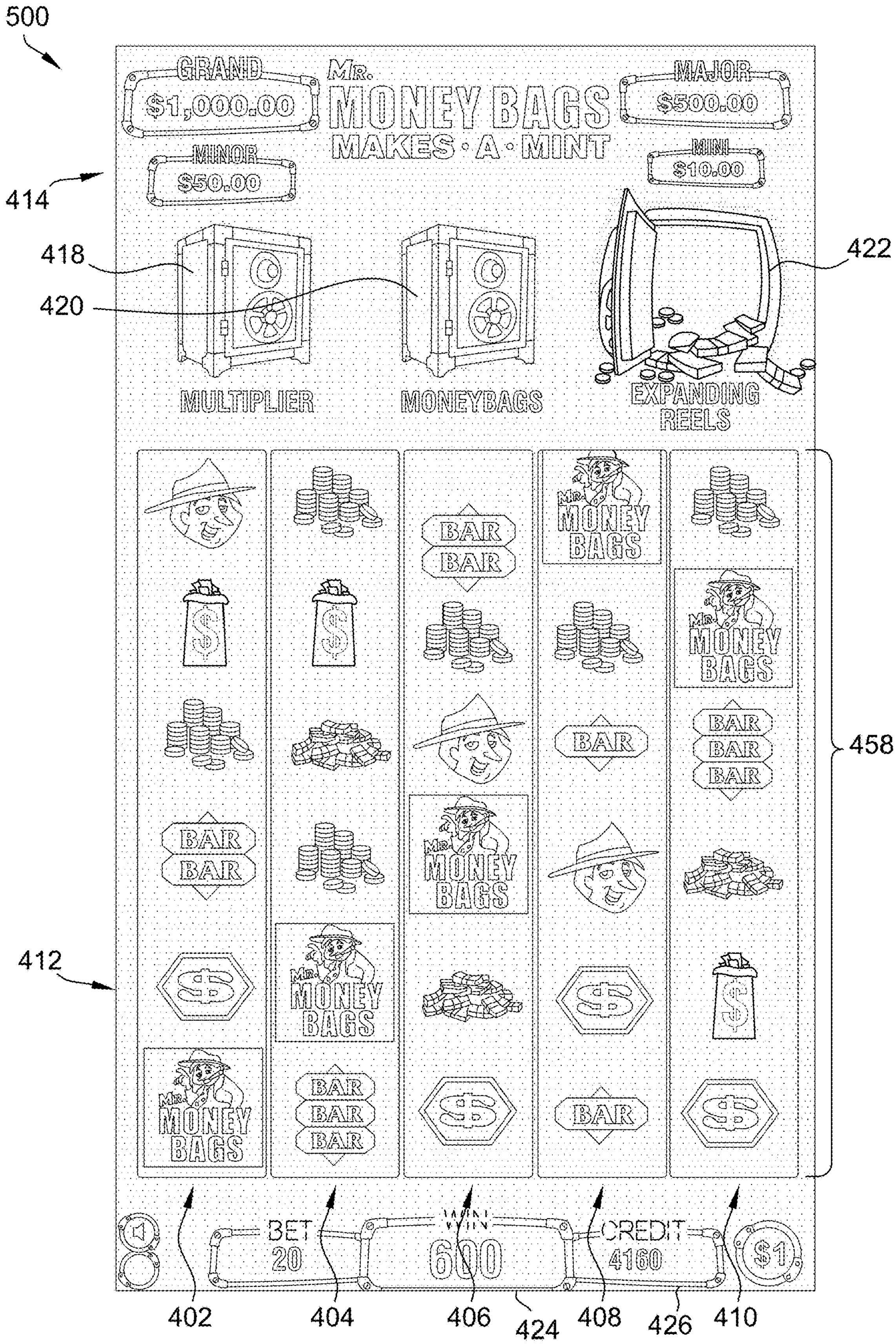

With reference now to FIGS. 13-15, user interfaces or screen shots of a sequence between the base reel game 400 (FIG. 13) and the bonus game 500 (FIGS. 14 and 15) having an expanding reels characteristic are shown. As shown in FIG. 13, in an outcome of the base reel game 400, an expanding reels enhancement symbol 456 associated with the expanding reels characteristic is displayed in the first reel matrix 416. The expanding reels enhancement symbol 456 in the example implementation is only shown on reel 408, although in other examples the expanding reels enhancement symbol 456 may be shown on any of the first plurality of reels 402-410. As shown in FIG. 14, the expanding reels metamorphic 422 is transformed to the active state (e.g., the Expanding Reels Safe opens) in response to the expanding reels enhancement symbol 456 being displayed in the first reel matrix 416 in the outcome of the base reel game 400. In the example implementation, the expanding reels metamorphic 422 transforms to the active state from an inactive state (e.g., the Expanding Reels Safe is closed), visually representing that the bonus game 500 having the expanding reels characteristic is triggered. In other examples, if the bonus game 500 is not triggered, the expanding reels metamorphic 456 may transform to an intermediate state (e.g., the Expanding Reels Safe may move and/or grow in size) in response to the expanding reels enhancements symbol 456 being displayed in the first reel matrix 416 in the outcome of the base reel game 400.

As shown in FIG. 14, after the expanding reels enhancement symbol 456 is displayed in the first reel matrix 416 in the outcome of the base reel game 400, and during and/or after the expanding reels metamorphic 422 transforms to the active state, the bonus game 500 having the expanding reels characteristic is initiated and the first reel matrix "expands" to a second reel matrix 458 that includes a greater number of rows than the first reel matrix 416. In the example implementation, the 3×5 first reel matrix 416 expands to a 6×5 second reel matrix 458, thus doubling the number of rows included in the second reel matrix 458 during the bonus game 500 having the expanding reels characteristic. In addition, a pop-up 460 is overlaid over the second reel matrix 458 prior to the free spins of the bonus game 500 having the expanding reels characteristic. The pop-up 460 indicates that the expanded second reel matrix 458 increases the opportunity for a winning symbol combination being displayed in an outcome of the bonus game 500 having the expanding reels characteristic. For example, as shown in FIG. 14, the pop-up 460 indicates that 40 lines are being played, signifying 40 different winning symbol combination paths, which is doubled from the base reel game 400 that only includes 20 lines. The free spins of the bonus game 500 having the expanding reels characteristic are then displayed, the free spins including spin and stop sequences of the first plurality of reels 402-410 within the expanded second reel matrix 458. As shown in FIG. 15, winning symbol combinations in the second reel matrix 458 may then be displayed in the "original" 3×5 portion of the second reel matrix 458 and the "expanded" 3×5 portion of the second reel matrix 458. In the example implementation shown, the bonus game 500 having the expanding reels characteristic includes a spin and stop sequence of the first plurality of reels 402-410 in the second reel matrix 458, however, a plurality of reels that include different reel strips and associated award values than the first plurality of reels 402-410 may be utilized.

Although the implementations shown in FIGS. 6-15 illustrate the bonus game 500 having a single enhanced characteristic, any of the enhancement characteristics of the bonus game 500 may be mixed, matched, and combined during gameplay. For example, the bonus game 500 may include any combination of the award multiplier characteristic, the jackpot characteristic, and the expanding reels characteristic, such as any two of these characteristics or all three of these characteristics in a single bonus game 500.

Figure 16:
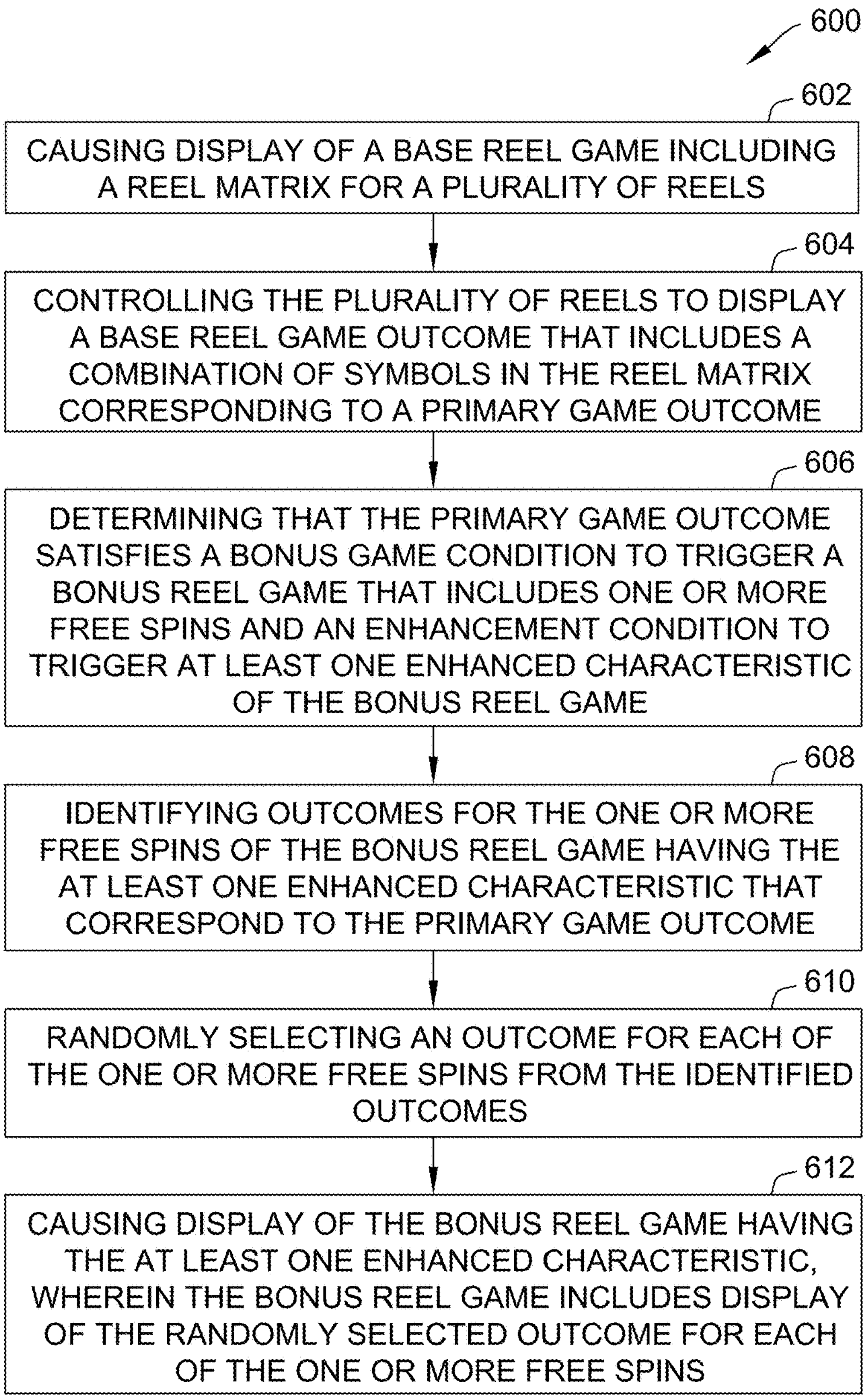
FIG. 16 is an example computer-implemented method of presenting one or more outcomes of a bonus reel game having one or more enhanced characteristics.

FIG. 16 illustrates an example computer-implemented method 600 of presenting one or more outcomes of a bonus reel game (e.g., the bonus game 500) having one or more enhanced characteristics. The one or more outcomes of the bonus reel game correspond to (e.g., present, represent, and/or are determined from) a primary game outcome. In the example implementation of the method 600, the primary game is a Class II (e.g., bingo) game, however, in other implementations, the primary game may be a Class III or Las-Vegas style game. The example method 600 may be implemented in a server (e.g., server 102) and/or a gaming device (e.g., gaming devices 104A-104X in FIG. 1, and/or gaming device 200 and/or mobile gaming device 256 in FIG. 2). For example, in an electronic gaming device, a game controller (e.g., game controller 202) includes one or more processors 204 operatively coupled to memory 208. The memory 208 can store one or more game programs 206 that provide program instructions and/or data for carrying out various implementations (e.g., game mechanics) that, when executed by the processor 204, cause the processor 204 to perform certain operations to perform the method 600.

The method 600 includes causing display 602 of a base reel game (e.g., the base reel game 400) on a display device (e.g., a primary game display 240 and/or a secondary game display 242) of the gaming device. As described in detail above, the base reel game includes display of a reel matrix (e.g., the first reel matrix 416) for a plurality of virtual or mechanical reels (e.g., the first plurality of reels 402, 404, 406, 408, and/or 410). In the example implementation, the base reel game displayed 602 on the game device is a spinning reel game simulation for presenting an outcome of a Class II (e.g., bingo) game. Accordingly, the method 600 also includes controlling 604 the plurality of reels to display a base reel game outcome that includes a combination of symbols displayed in the reel matrix, in which the base reel game outcome corresponds to a primary game outcome. As description of the method 600 proceeds, the primary game outcome presented by the base reel game outcome will be described as a bingo game outcome. It will be appreciated that, in other examples, the primary game outcome may be an outcome of another Class II game (e.g., a keno game). Moreover, in other implementations of the method 600, the primary game outcome may be a Class III or Las-Vegas style game outcome, as described elsewhere herein.

The base reel game outcome may be controlled 604 by a game controller (e.g., the game controller 202) and/or processor (e.g., processor 204) based on a bingo game outcome. As described herein, controlling 604 display of the base reel game outcome may include selecting symbols (e.g., from plurality of reel strips included in the plurality of reels) and displaying the selected symbol in the symbol positions within the reel matrix. To display symbols in a column of symbol positions within the reel matrix, the game controller and/or processor may simulate rotation or spinning of the plurality of reels within columns of the reel matrix, or mechanical reels having physical reel strips may be used as well. When a respective reel is simulated to halt or stop within an associated column, one or more selected symbols may be displayed in the symbol positions of the column. One or more of the selected symbols displayed in the reel matrix in the base reel game outcome is determined based on the bingo game outcome. For example, when a bingo game outcome includes a winning outcome and triggers an award, the game controller and/or processor may identify a winning base reel game outcome (e.g., by querying a database or table that associates winning bingo patterns with one or more outcomes for the base reel game) that is associated with the same award. Having identified a winning base reel game outcome associated with the same award as a winning outcome of the bingo game outcome, the game controller and/or processor may cause the plurality of reels to spin and stop to display a combination of symbols associated with the award in the reel matrix. It will also be appreciated that symbols may be displayed in the reel matrix in response to one or more player wagers and/or, in some cases, when a bonus game (e.g., bonus game 500) is triggered and one or more free spins are awarded. For example, as described in detail herein, enhancement symbols may be displayed in the reel matrix in the base reel game outcome in response to a bonus game having an associated enhanced characteristic is triggered. In Class III games, symbols may be selected randomly, such as based upon a random number provided by the RNG 212.

The method 600 also includes determining 606 that the bingo game outcome satisfies both a bonus game condition to trigger a bonus reel game (e.g., the bonus game 500) and an enhancement condition to trigger one or more enhanced characteristics (e.g., an award multiplier characteristic, a jackpot characteristic, and/or an expanding reels characteristic, or any combination thereof, as described in detail herein). As described elsewhere herein, the game controller and/or processor may determine that the bingo game outcome satisfies the bonus game condition based on a number of winning bingo patterns included in the bingo game outcome. For example, the bonus game condition may be satisfied by a predefined or preselected number of winning bingo patterns included in the bingo game outcome, and the game controller and/or processor may identify and translate the number of winning patterns occurring on the bingo card to a number of free spins included in the bonus game. As another example, the bonus game condition may be satisfied when an award associated with a bingo winning pattern is greater than or equal to a predetermined award value and/or when the predetermined award value is capable of being partitioned into or distributed across a predefined or preselected number of free spins. Other conditions for satisfying the bonus game condition may exist, including, for example, those described elsewhere herein. When the bonus reel game is triggered by the bonus game condition being satisfied, the game controller and/or processor may award one or more free spins based upon any suitable criterion or group of criteria, such as, for example, a number of winning patterns included in the bingo game outcome, a total award value of the bingo game outcome, the value of a random number generated by the RNG 212, the symbol combination occurring on the reels in the base reel game outcome, and the like.

In one example implementation, the game controller and/or processor may query a database or table for one or more façades that contain one or more free spins and associated outcomes of the bonus reel game (e.g., one or more free spins outcomes) that can present the bingo game outcome. As description of the method 600 proceeds, and as used herein, the terms "façade" and "outcome" of the base reel game and/or bonus reel game may be used interchangeably. It will be appreciated that description of identifying outcomes for the base reel game and/or the bonus reel game that can present the bingo game outcome refers to identifying façades for presenting the bingo game outcome as spins and associated outcomes during the base reel game and/or the bonus reel game. The database or table may associate each possible bingo winning pattern and/or award value with one or more outcomes of the base reel game and/or one or more outcomes of the bonus game. In response to determining that the bingo game outcome includes one or more winning patterns and/or includes an award value, the game controller and/or processor may query the database or table to determine whether there are one or more outcomes of the bonus game that correspond to (e.g., are able to present) the bingo game outcome. If corresponding outcomes of the bonus game exist, the game controller and/or processor may determine 606 that the bonus game condition is satisfied.

The game controller and/or processor may determine 606 that the enhancement condition is satisfied during and/or after determining 606 that the bonus game condition is satisfied. In the example implementation, the game controller and/or processor determines 606 that the enhancement condition is satisfied if the bingo game outcome can be presented as one or more outcome of the bonus reel game having one or more enhanced characteristics. To make this determination, the game controller and/or processor may query a database or table that associates certain bingo game outcomes with one or more free spin outcomes of the bonus game 500 having one or more enhanced characteristics. This database or table may be the same or different from the database or table used to determine 606 whether the bonus game condition is satisfied. For example, in some implementations, the bonus game condition being satisfied may be a prerequisite for determining 606 that the enhancement condition is satisfied, and the game controller and/or processor may query a different database or table to determine 606 whether the enhancement condition is satisfied in response to the bonus game condition being satisfied.

In some implementations, the game controller and/or processor may query the same database or table for determining 606 that each of the bonus game condition and the enhancement condition are satisfied. For example, the database or table may store winning bingo game outcomes (e.g., individual winning patterns, combinations of winning patterns, total award values, and the like) and associate each winning bingo game outcome with one or more base reel game outcomes, one or more bonus reel game outcomes, and/or one or more outcomes of bonus reel games having various enhanced characteristics. The game controller and/or processor may determine 606 that the bonus game condition and the enhancement condition are each satisfied by the bingo game outcome if, based on the query, the bingo game outcome maps to one or more outcomes of a bonus game having an enhanced characteristic (or multiple enhanced characteristics).

In the example implementations, a bingo game outcome may map to multiple outcomes of bonus games having one or more enhanced characteristics. For example, for a given bingo game outcome, one or more outcomes of multiple different bonus reel games each having different enhanced characteristics and/or different combinations of enhanced characteristics may be able to present the given bonus game outcome. This is an advantageous game design feature as it further increases the flexibility and variability of the presenting bingo game outcomes. That is, for a given bingo game outcome, there may be dozens, hundreds, or thousands of variations of outcomes of bonus reel games having different enhanced characteristics or combinations of enhanced characteristics that are able to present the bingo game outcome.

Accordingly, the method 600 also includes identifying 608 outcomes for the bonus reel game having an enhanced characteristic or a combination of enhanced characteristics that correspond to (e.g., are able to present) the bingo game outcome in response to the bonus game condition and the enhancement condition each being satisfied. The identified 608 outcomes may include outcomes of bonus reel games having different enhanced characteristics. For example, for a given bingo game outcome, the identified 608 outcomes may include outcomes of bonus reel games having an award multiplier characteristic, a jackpot characteristic, and/or an expanding reels characteristic. The identified 608 outcomes may also include outcomes of bonus reel games having any combination of these characteristics (e.g., an award multiplier characteristic combined with a jackpot characteristic, a jackpot characteristic combined with an expanding reels characteristic, an award multiplier characteristic combined with an expanding reels characteristic, or all three characteristics combined). It will be appreciated that the identified 608 outcomes depend on the given bingo game outcome. More specifically, each of the identified 608 outcomes are able to present the bingo game outcome, and certain bonus reel game outcomes may be able to present certain bingo game outcomes and not others. Moreover, for some bingo game outcomes, no outcomes may be identified 608 (i.e., no bonus reel game outcomes are able to present the bingo game outcome).

To determine the outcome to be presented in the triggered bonus reel game, the method 600 also includes randomly selecting 610 an outcome for the bonus reel game from the identified 608 outcomes. The outcome may be randomly selected 610 from the identified 608 outcomes, for example, based upon a random number provided by the RNG 212. The randomly selected 610 outcome may include preselected or predefined outcomes for each free spin of the bonus reel game. Alternatively, a separate outcome may be randomly selected 610 from the identified 608 outcomes for each free spin of the bonus reel game. For example, if the bonus reel game includes three free spins, three outcomes may be randomly selected 610 from the identified 608 outcomes. After the one or more outcomes for the bonus reel game have been selected 610, the method 600 continues by initiating 612, on the display device, the bonus reel game having the enhanced characteristic(s), where the bonus reel game includes display of the randomly selected 610 outcome(s) for one or more free spins.

In the example implementation, when a bonus reel game having an enhanced characteristic (or a combination of enhanced characteristics) is played, the same enhanced characteristic(s) are applied during each free spin of the bonus reel game. Thus, in randomly selecting 610 outcomes from the identified 608 outcomes for bonus reel games having different enhanced characteristic(s), the game controller and/or processor must ensure that each randomly selected 610 outcome is for a bonus reel game having the same enhanced characteristic(s). Thus, before selecting 610 the outcome(s), the game controller and/or processor may randomly select, from the identified 608 outcomes, a subset of outcomes of bonus reel games having the same enhanced characteristic(s). The game controller and/or processor may then randomly select 610 one or more outcomes from the subset. After the one or more outcomes for the bonus reel game have been selected 610 from the subset, the method 600 continues by initiating 612, on the display device, the bonus reel game having the enhanced characteristic(s), wherein the bonus reel game includes display of the randomly selected 610 outcome(s) for one or more free spins.

As an illustrative example, for a given bingo game outcome, multiple outcomes for a bonus reel game having a jackpot characteristic may be identified 608 and multiple outcomes for a bonus reel game having a combination of an award multiplier characteristic and an expanding reels characteristic may also be identified 608. The game controller and/or processor may initially randomly select the multiple outcomes for the bonus reel game having the jackpot characteristic as the subset for randomly selecting 610 one or more outcomes for the bonus reel game. The game controller and/or processor may then randomly select 610 one or more outcomes for the bonus reel game having the jackpot characteristic from the multiple identified 608 outcomes for the bonus reel game having the jackpot characteristic and initiate 612 the bonus reel game having the jackpot characteristic, where the bonus reel game includes display of the randomly selected 610 outcome(s) for one or more free spins.

In some implementations, outcomes may be identified 608 for individual winning patterns of the bingo game outcome. As an illustrative example, the bingo game outcome may include a plurality of winning patterns including a first winning pattern and a second winning pattern. The game controller and/or the processor may determine that the bonus reel game is able to present one or more outcomes corresponding to the first winning pattern and the second winning pattern as described above. For example, the game controller and/or processor may query the table or database that associates each winning pattern of the bingo game with one or more base reel game outcomes, one or more bonus reel game outcomes, and/or one or more outcomes of bonus reel games having various enhanced characteristics, and, based on the query, determine that one or more bonus reel game outcomes correspond to the first winning pattern and the second winning pattern (i.e., determine that each of the first winning pattern and the second winning pattern can be presented as one or more bonus reel game outcomes).

In these implementations, the game controller and/or processor may determine that the first winning pattern and the second winning pattern each satisfy the enhancement condition by determining (e.g., based on a query to the table or database described herein) that one or more bonus reel game outcomes having the same enhanced characteristic(s) correspond to (e.g., are able to present) the first winning pattern and the second winning pattern. That is, the game controller and/or processor may determine that one or more outcomes for bonus reel games having one or more enhanced characteristics correspond to (e.g., are able to present) the first winning pattern, and that one or more outcomes for bonus reel games having one or more enhanced characteristics correspond to (e.g., are able to present) the second winning pattern, and then compares the outcomes corresponding to the first and second winning patterns to determine whether the first and second winning patterns each trigger a bonus reel game having a common enhanced characteristic (or common combination of enhanced characteristics). The game controller and/or processor may then identify 608 the outcomes of the bonus reel game(s) having the common enhanced characteristic(s).

In these implementations, the game controller and/or processor may randomly select 610 one or more outcomes of the bonus reel game having the common enhanced characteristic(s) from the identified 608 outcomes that correspond to the first winning pattern and the second winning pattern. In some examples, one outcome may be selected 610 from the identified 608 outcomes for the first winning pattern and one outcome may be selected 610 for the second winning pattern. In other examples, multiple outcomes may be selected for either or both the first winning pattern and the second winning pattern (i.e., the first winning pattern and/or the second winning pattern may be presented across multiple selected 610 outcomes). As described above, in randomly selecting 610 outcomes from the identified 608 outcomes for the first winning pattern and the second winning pattern, the game controller and/or processor must ensure that each randomly selected 610 outcome is for a bonus reel game having the same common enhanced characteristic(s). In some examples, the first winning pattern and the second winning pattern may trigger multiple variations of the bonus reel game having a common enhanced characteristic. Thus, before selecting 610 the outcome(s), the game controller and/or processor may randomly select, from the identified 608 outcomes, a subset of outcomes of bonus reel games having the same common enhanced characteristic(s). The game controller and/or processor may then randomly select 610 one or more outcomes from the subset and initiate 612 the bonus reel game having the common enhanced characteristic(s), where the bonus reel game includes display of the randomly selected 610 outcome(s) corresponding to the first winning pattern and the randomly selected 610 outcome(s) corresponding to the second winning pattern.

As an illustrative example, for a given bingo game outcome having a first winning pattern and a second winning pattern, multiple outcomes corresponding to the first winning pattern and multiple outcomes for the second winning pattern may be identified 608 for bonus reel games having varying enhanced characteristic(s). For example, for the first winning pattern, multiple outcomes for a bonus reel game having a jackpot characteristic may be identified 608, multiple outcomes for a bonus reel game having an expanding reels characteristic may be identified 608, and multiple outcomes for a bonus reel game having a combination of a jackpot characteristic and an award multiplier characteristic may also be identified 608. For the second winning pattern, multiple outcomes for a bonus reel game having a jackpot characteristic may be identified 608, multiple outcomes for a bonus reel game having an award multiplier characteristic may be identified 608, and multiple outcomes for a bonus reel game having a combination of a jackpot characteristic and an award multiplier characteristic may also be identified 608. The game controller and/or processor may initially determine that the common enhanced characteristic(s) of bonus reel games corresponding to the first and second winning patterns are a jackpot characteristic and a combination of a jackpot characteristic and an award multiplier characteristic. The game controller and/or processor may then randomly select the multiple outcomes for the bonus reel game having the jackpot characteristic as the subset for randomly selecting 610 one or more outcomes for the bonus reel game corresponding to each of the first and second winning patterns. The game controller and/or processor may then randomly select 610 one or more outcomes for the bonus reel game having the jackpot characteristic from the multiple identified 608 outcomes to present the first winning pattern and randomly select 610 one or more outcomes for the bonus reel game having the jackpot characteristic from the multiple identified 608 outcomes to present the second winning pattern. The game controller and/or processor may then initiate 612 the bonus reel game having the jackpot characteristic, where the bonus reel game includes display of the randomly selected 610 outcome(s) corresponding to the first winning pattern and the randomly selected 610 outcome(s) corresponding to the second winning pattern.

A computer, controller, or server, such as those described herein, includes at least one processor or processing unit and a system memory. The computer, controller, or server typically has at least some form of computer readable non-transitory media. As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit, and other programmable circuits "configured to" carry out programmable instructions, and these terms are used interchangeably herein. In the implementations described herein, memory may include, but is not limited to, a computer-readable medium or computer storage media, volatile and nonvolatile media, removable and non-removable media implemented in any method or technology for storage of information such as computer readable instructions, data structures, program modules, or other data. Such memory includes a random access memory (RAM), computer storage media, communication media, and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the implementations described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary implementation, additional output channels may include, but not be limited to, an operator interface monitor.

As indicated above, the process may be embodied in computer software. The computer software could be supplied in a number of ways, for example on a tangible, non-transitory, computer readable storage medium, such as on any nonvolatile memory device (e.g. an EEPROM). Further, different parts of the computer software can be executed by different devices, such as, for example, in a client-server relationship. Persons skilled in the art will appreciate that computer software provides a series of instructions executable by the processor.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. An electronic gaming device comprising:

a display device; and a game controller in communication with the display device, the game controller comprising a processor and a memory device, the memory device storing instructions, which when executed by the processor, cause the game controller to:

control the display device to display a base reel game including a reel matrix for a plurality of reels;

control the plurality of reels to display a base reel game outcome that includes a combination of symbols in the reel matrix corresponding to a primary game outcome;

determine that the primary game outcome satisfies a bonus game condition to trigger a bonus reel game that includes one or more free spins and an enhancement condition to trigger at least one enhanced characteristic of the bonus reel game;

in response to the bonus game condition and the enhancement condition each being satisfied, identify outcomes for the one or more free spins of the bonus reel game having the at least one enhanced characteristic;

randomly select an outcome for each of the one or more free spins from the identified outcomes; and initiate, on the display device, the bonus reel game having the at least one enhanced characteristic, wherein the bonus reel game includes display of the randomly selected outcome for each of the one or more free spins.

2. The electronic gaming device of claim 1, wherein the primary game outcome is a bingo game outcome including a plurality of winning bingo patterns.

3. The electronic gaming device of claim 2, wherein the plurality of winning bingo patterns includes a first winning pattern and a second winning pattern, and wherein the instructions stored in the memory device, when executed by the processor, cause the game controller to:

determine that the first and second winning patterns each trigger the bonus reel game and trigger the at least one enhanced characteristic of the bonus reel game, wherein the at least one enhanced characteristic includes a common enhanced characteristic triggered by each of the first and second winning patterns;

identify outcomes for the one or more free spins of the bonus reel game having the common enhanced characteristic that correspond to the first winning pattern and the second winning pattern;

randomly select a first outcome for the one or more free spins from the identified outcomes that corresponds to the first winning pattern and a second outcome for the one or more free spins from the identified outcomes that corresponds to the second winning pattern; and initiate, on the display device, the bonus reel game having the common enhanced characteristic, wherein the bonus reel game includes display of the randomly selected first outcome and the randomly selected second outcome.

4. The electronic gaming device of claim 3, wherein the common enhanced characteristic triggered by each of the first and second winning patterns includes at least a first common enhanced characteristic and a second common enhanced characteristic, and wherein the instructions stored in the memory device, when executed by the processor, cause the game controller to randomly select one of the at least the first and second common enhanced characteristic.

5. The electronic gaming device of claim 1, wherein the instructions stored in the memory device, when executed by the processor, cause the game controller to:

control the display device to display, in the base reel game outcome, at least one enhancement symbol in the reel matrix, the at least one enhancement symbol being associated with the at least one enhanced characteristic; and in response to the bonus game condition and the enhancement condition each being satisfied, control the display device to display a visual representation that the at least one enhancement symbol being displayed in the reel matrix in the base reel game outcome triggers the at least one enhanced characteristic of the bonus reel game.

6. The electronic gaming device of claim 1, wherein the instructions stored in the memory device, when executed by the processor, cause the game controller to:

control the display device to display at least one metamorphic in an inactive state, the at least one metamorphic being associated with the at least one enhanced characteristic;

control the display device to display, in the base reel game outcome, at least one enhancement symbol in the reel matrix, the at least one enhancement symbol being associated with the at least one metamorphic; and in response to the bonus game condition and the enhancement condition each being satisfied, control the display device to:

transform the at least one metamorphic from the inactive state to an active state; and display a visual representation that the at least one enhancement symbol being displayed in the reel matrix in the base reel game outcome causes the at least one metamorphic to be transformed to the active state and triggers the at least one enhanced characteristic of the bonus reel game.

7. The electronic gaming device of claim 6, wherein, if the bonus game condition is not satisfied, the instructions stored in the memory device, when executed by the processor, cause the game controller to control the display device to:

transform the at least one metamorphic from the inactive state to an intermediate state, transformation of the at least one metamorphic to the intermediate state representing that the bonus reel game has not been triggered; and display a visual representation that the at least one enhancement symbol being displayed in the reel matrix in the base reel game outcome causes the at least one metamorphic to be transformed to the intermediate state.

8. The electronic gaming device of claim 1, wherein the bonus reel game having the at least one enhanced characteristic includes, for each of the one or more free spins, display of one of: i) a second plurality of reels that is different from the plurality of reels of the base reel game, ii) the plurality of reels of the base reel game in a second reel matrix having a number of rows that is greater than a number of rows of the reel matrix of the base reel game, and iii) the second plurality of reels in the second reel matrix.

9. The electronic gaming device of claim 1, wherein the at least one enhanced characteristic includes a jackpot characteristic, the bonus reel game having the jackpot characteristic including, for each of the one or more free spins, display of a second plurality of reels, wherein the second plurality of reels include credit symbols that, when displayed in the randomly selected outcome for any of the one or more free spins, are associated with an award value.

10. The electronic gaming device of claim 1, wherein the at least one enhanced characteristic includes an expanding reels characteristic, the bonus reel game having the expanding reels characteristic including display of a second plurality of reels in a second reel matrix, the second reel matrix having a number of rows that is greater than a number of rows of the reel matrix of the base reel game such that a number of paylines for the randomly selected outcome for each of the one or more free spins is greater than a number of paylines for the base reel game outcome.

11. The electronic gaming device of claim 10, wherein the second plurality of reels is different from the plurality of reels.

12. The electronic gaming device of claim 1, wherein the at least one enhanced characteristic includes an award multiplier characteristic, wherein an award value for the randomly selected outcome for at least one of the one or more free spins is increased by an award multiplier.

13. The electronic gaming device of claim 12, wherein the award value for the randomly selected outcome for each of the one or more free spins is independently increased by a different award multiplier.

14. The electronic gaming device of claim 1, wherein the at least one enhanced characteristic of the bonus reel game includes at least two enhanced characteristics.

15. The electronic gaming device of claim 1, wherein the at least two enhanced characteristics are selected from:

i) a jackpot characteristic, the bonus reel game having the jackpot characteristic including, for each of the one or more free spins, display of a second plurality of reels, wherein the second plurality of reels include credit symbols that, when displayed in the randomly selected outcome for any of the one or more free spins, are associated with an award value, ii) an expanding reels characteristic, the bonus reel game having the expanding reels characteristic including display of the plurality of reels or the second plurality of reels in a second reel matrix, the second reel matrix having a number of rows that is greater than a number of rows of the reel matrix of the base reel game such that a number of paylines for the randomly selected outcome for each of the one or more free spins is greater than a number of paylines for the base reel game outcome, and iii) an award multiplier characteristic, wherein an award value for the randomly selected outcome for at least one of the one or more free spins is increased by an award multiplier.

16. A method of electronic gaming implemented on an electronic gaming machine, the method comprising:

causing display of a base reel game including a reel matrix for a plurality of reels;

controlling the plurality of reels to display a base reel game outcome that includes a combination of symbols in the reel matrix corresponding to a primary game outcome;

determining that the primary game outcome satisfies a bonus game condition to trigger a bonus reel game that includes one or more free spins and an enhancement condition to trigger at least one enhanced characteristic of the bonus reel game;

in response to the bonus game condition and the enhancement condition each being satisfied, identifying outcomes for the one or more free spins of the bonus reel game having the at least one enhanced characteristic;

randomly selecting an outcome for each of the one or more free spins from the identified outcomes; and causing display of the bonus reel game having the at least one enhanced characteristic, wherein the bonus reel game includes display of the randomly selected outcome for each of the one or more free spins.

17. The method of claim 16, wherein the primary game outcome is a bingo game outcome including a first winning pattern and a second winning pattern, the method further comprising:

determining that the first and second winning patterns each trigger the bonus reel game and trigger the at least one enhanced characteristic of the bonus reel game, wherein the at least one enhanced characteristic includes a common enhanced characteristic triggered by each of the first and second winning patterns;

identifying outcomes for the one or more free spins of the bonus reel game having the common enhanced characteristic that correspond to the first winning pattern and the second winning pattern;

randomly selecting a first outcome for the one or more free spins from the identified outcomes that corresponds to the first winning pattern and a second outcome for the one or more free spins from the identified outcomes that corresponds to the second winning pattern; and causing display of the bonus reel game having the common enhanced characteristic, wherein the bonus reel game includes display of the randomly selected first outcome and the randomly selected second outcome.

18. The method of claim 17, wherein the common enhanced characteristic triggered by each of the first and second winning patterns includes at least a first common enhanced characteristic and a second common enhanced characteristic, the method further comprising randomly selecting one of the at least the first and second common enhanced characteristic.

19. A non-transitory computer-readable storage medium with instructions stored thereon that, in response to execution by at least one processor, cause the at least one processor to:

control a display device to display a base reel game including a reel matrix for a plurality of reels;

control the plurality of reels to display a base reel game outcome that includes a combination of symbols in the reel matrix corresponding to a primary game outcome;

determine that the primary game outcome satisfies a bonus game condition to trigger a bonus reel game that includes one or more free spins and an enhancement condition to trigger at least one enhanced characteristic of the bonus reel game;

in response to the bonus game condition and the enhancement condition each being satisfied, identify outcomes for the one or more free spins of the bonus reel game having the at least one enhanced characteristic;

randomly select an outcome for each of the one or more free spins from the identified outcomes; and initiate, on the display device, the bonus reel game having the at least one enhanced characteristic, wherein the bonus reel game includes display of the randomly selected outcome for each of the one or more free spins.

20. The non-transitory computer-readable storage medium of claim 19, wherein the primary game outcome is a bingo game outcome including a first winning pattern and a second winning pattern, and wherein the instructions, when executed, cause the at least one processor to:

determine that the first and second winning patterns each trigger the bonus reel game and trigger the at least one enhanced characteristic of the bonus reel game, wherein the at least one enhanced characteristic includes a common enhanced characteristic triggered by each of the first and second winning patterns;

identify outcomes for the one or more free spins of the bonus reel game having the common enhanced characteristic that correspond to the first winning pattern and the second winning pattern;

randomly select a first outcome for the one or more free spins from the identified outcomes that corresponds to the first winning pattern and a second outcome for the one or more free spins from the identified outcomes that corresponds to the second winning pattern; and cause display of the bonus reel game having the common enhanced characteristic, wherein the bonus reel game includes display of the randomly selected first outcome and the randomly selected second outcome.

* * * * *